(12) United States Patent
Cabrera et al.

(10) Patent No.: US 9,384,362 B2
(45) Date of Patent: *Jul. 5, 2016

(54) METHOD AND SYSTEM FOR DISTRIBUTING SECRETS

(71) Applicant: Intuit Inc., Mountain View, CA (US)

(72) Inventors: Luis Felipe Cabrera, Bellevue, WA (US); M. Shannon Lietz, San Marcos, CA (US); James Armitage, San Diego, CA (US); Oleg Gryb, San Francisco, CA (US); Elangovan Shanmugam, Cupertino, CA (US); Sabu Kuruvila Philip, Redwood City, CA (US); Brett Weaver, San Diego, CA (US); Thomas Bishop, San Diego, CA (US); Troy Otillio, Carlsbad, CA (US); Jinglei Whitehouse, Wayland, MA (US); Jeffrey M. Wolfe, Parrish, FL (US); Ankur Jain, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/053,488

(22) Filed: Oct. 14, 2013

(65) Prior Publication Data

US 2015/0106869 A1    Apr. 16, 2015

(51) Int. Cl.
*G06F 17/00* (2006.01)
*H04L 29/06* (2006.01)
(Continued)

(52) U.S. Cl.
CPC ............ *G06F 21/6218* (2013.01); *G06F 21/33* (2013.01)

(58) Field of Classification Search
CPC ....................................................... G06F 21/60

USPC ............................................................ 726/1
See application file for complete search history.

(56) References Cited

U.S. PATENT DOCUMENTS 5,003,596 A  3/1991  Wood
6,157,723 A  12/2000  Schultz
(Continued)

FOREIGN PATENT DOCUMENTS

EP         2645673        10/2013
WO     WO 2010/144735    12/2010

OTHER PUBLICATIONS

Cabrera et al., "Method and System for Providing a Secure Secrets Proxy," U.S. Appl. No. 14/054,450, filed Oct. 15, 2013.
(Continued)

*Primary Examiner* — Taghi Arani
*Assistant Examiner* — Khalil Naghdali
(74) *Attorney, Agent, or Firm* — Hawley Troxell Ennis & Hawley LLP; Philip McKay

(57) ABSTRACT

Secrets data representing one or more secrets required to access associated resources is provided along with secrets distribution policy data representing one or more secrets distribution factors used to control the distribution of the secrets. When a requesting virtual asset submits secrets request data, virtual asset profile data associated with the requesting virtual asset is obtained. The requesting virtual asset profile data is then analyzed using at least one of the secrets distribution factors to authenticate the requesting virtual asset. The requesting virtual asset profile data is then analyzed using one or more of secrets distribution factors to determine what secrets the requesting virtual asset legitimately needs. Authorized secrets data for the requesting virtual asset representing one or more authorized secrets is then generated. The requesting virtual asset is then provided access to the authorized secrets data.

50 Claims, 6 Drawing Sheets

(51) Int. Cl.
*G06F 21/62* (2013.01)
*G06F 21/33* (2013.01)

(56) References Cited

U.S. PATENT DOCUMENTS

| | | | |
|---|---|---|---|
| 6,324,648 B1 | 11/2001 | Grantges, Jr. | |
| 6,981,041 B2 | 12/2005 | Araujo et al. | |
| 6,996,716 B1 | 2/2006 | Hsu | |
| 7,336,790 B1 | 2/2008 | Caronni et al. | |
| 7,380,120 B1 * | 5/2008 | Garcia | 713/160 |
| 7,546,629 B2 * | 6/2009 | Albert et al. | 726/1 |
| 7,715,565 B2 * | 5/2010 | Kimmel et al. | 380/281 |
| 7,739,501 B2 | 6/2010 | Kimmel et al. | |
| 8,095,960 B2 | 1/2012 | Boogert et al. | |
| 8,316,237 B1 | 11/2012 | Felsher et al. | |
| 8,352,999 B1 | 1/2013 | Zhan et al. | |
| 8,498,941 B2 | 7/2013 | Felsher | |
| 8,560,857 B2 | 10/2013 | Munetoh et al. | |
| 8,656,189 B2 | 2/2014 | Orsini et al. | |
| 8,700,906 B2 | 4/2014 | Kamara et al. | |
| 8,826,013 B1 | 9/2014 | Kodukula et al. | |
| 8,880,882 B2 * | 11/2014 | Kulkarni et al. | 713/168 |
| 2002/0023065 A1 | 2/2002 | Frelechoux et al. | |
| 2004/0210591 A1 | 10/2004 | Hirschfeld et al. | |
| 2005/0138110 A1 | 6/2005 | Redlich et al. | |
| 2006/0215839 A1 | 9/2006 | Augenstein et al. | |
| 2006/0291664 A1 | 12/2006 | Suarez et al. | |
| 2007/0276931 A1 | 11/2007 | Mahdavi et al. | |
| 2008/0013569 A1 | 1/2008 | Boren | |
| 2008/0072309 A1 | 3/2008 | Kleinsteiber et al. | |
| 2008/0083036 A1 | 4/2008 | Ozzie et al. | |
| 2008/0098392 A1 * | 4/2008 | Wipfel | G06F 9/468 718/1 |
| 2008/0109491 A1 | 5/2008 | Gupta | |
| 2008/0319909 A1 | 12/2008 | Perkins et al. | |
| 2009/0092252 A1 | 4/2009 | Noll et al. | |
| 2009/0103724 A1 | 4/2009 | Tamai | |
| 2009/0204631 A1 | 8/2009 | Pomroy et al. | |
| 2009/0287837 A1 | 11/2009 | Felsher | |
| 2010/0082991 A1 | 4/2010 | Baldwin et al. | |
| 2010/0189251 A1 | 7/2010 | Curren | |
| 2011/0004752 A1 | 1/2011 | Shukla | |
| 2011/0022812 A1 | 1/2011 | van der Linden et al. | |
| 2011/0093707 A1 | 4/2011 | Green et al. | |
| 2011/0191595 A1 | 8/2011 | Damian et al. | |
| 2011/0219035 A1 | 9/2011 | Korsunsky et al. | |
| 2011/0277027 A1 | 11/2011 | Hayton et al. | |
| 2012/0131189 A1 | 5/2012 | Smart et al. | |
| 2012/0185913 A1 | 7/2012 | Martinez et al. | |
| 2012/0204032 A1 | 8/2012 | Wilkins et al. | |
| 2012/0303776 A1 | 11/2012 | Ferris | |
| 2012/0311564 A1 | 12/2012 | Khalid | |
| 2013/0019284 A1 * | 1/2013 | Pacyga et al. | 726/4 |
| 2013/0060825 A1 | 3/2013 | Farcasiu et al. | |
| 2013/0097706 A1 | 4/2013 | Titonis et al. | |
| 2013/0104213 A1 | 4/2013 | Nandakumar | |
| 2013/0125247 A1 * | 5/2013 | Sprague et al. | 726/28 |
| 2013/0204849 A1 | 8/2013 | Chacko | |
| 2013/0219456 A1 | 8/2013 | Sharma et al. | |
| 2013/0254539 A1 | 9/2013 | Auradkar et al. | |
| 2013/0346558 A1 | 12/2013 | Khalidi et al. | |
| 2014/0007178 A1 | 1/2014 | Gillum et al. | |
| 2014/0007239 A1 | 1/2014 | Sharpe et al. | |
| 2014/0026179 A1 * | 1/2014 | Devarajan et al. | 726/1 |
| 2014/0068732 A1 | 3/2014 | Hinton et al. | |
| 2014/0074637 A1 | 3/2014 | Hammad | |
| 2014/0075499 A1 | 3/2014 | Arun et al. | |
| 2014/0165134 A1 * | 6/2014 | Goldschlag et al. | 726/1 |
| 2014/0282840 A1 | 9/2014 | Guinan | |
| 2014/0283010 A1 | 9/2014 | Rutkowski et al. | |
| 2014/0330869 A1 | 11/2014 | Factor et al. | |

OTHER PUBLICATIONS

Weaver et al., "Method and System for Automatically Managing Secret Application and Maintenance," U.S. Appl. No. 14/069,921, filed Nov. 1, 2013.

Lietz et al., "Method and System for Automatically Managing Secure Communications in Multiple Communications Jurisdiction Zones," U.S. Appl. No. 14/070,168, filed Nov. 1, 2013.

Cabrera et al., "Method and System for Automatically Managing Secrets in Multiple Data Security Jurisdiction Zones," U.S. Appl. No. 14/073,110, filed Nov. 6, 2013.

Lietz et al., "Method and System for Accommodating Communications Channels Using Different Secure Communications Protocols," U.S. Appl. No. 14/215,432, filed Mar. 17, 2014.

Lietz et al., "Method and Apparatus to Rotate Data Encryption Keys in Databases with No Down Time," U.S. Appl. No. 14/263,808, filed Apr. 28, 2014.

Cabrera et al., "Method and Apparatus for Multi-Tenancy Secrets Management," U.S. Appl. No. 14/265,930, filed Apr. 30, 2014.

Reddy et al., "Security Architecture of Cloud Computing," *International Journal of Engineering Science and Technology (IJEST)* vol. 3, No. 9, Sep. 9, 2011, pp. 7149-7155.

* cited by examiner

METHOD AND SYSTEM FOR DISTRIBUTING SECRETS

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based infrastructures, and/or other distributive computing models. This is because many owners and operators of data centers that provide access to data and other resources are extremely hesitant to allow their data and resources to be accessed, processed, and/or otherwise used, by virtual assets, such as virtual machine and server instances in the cloud.

One mechanism historically used to control access to the data and other resources is the use of various secrets such as, but not limited to, passwords, encryption keys, and digital certificates, to control and authenticate entities desiring to access various types of data and resources. There is little doubt, the use of secrets can be an effective method for ensuring that data and other resources are only accessible by an authorized virtual asset. However, ensuring that a given virtual asset is provided the entire collection of secrets that it needs to perform its designated tasks, and equally importantly, ensuring that the virtual asset does not receive any secrets that it does not legitimately need, is often a complicated and time consuming task that not only expends significant resources, but currently creates a significant delay in the initiation and operation of virtual assets. This is particularly problematic given that, currently, secrets management is largely a manual process.

What is needed is a method and system to authenticate that a virtual asset is eligible to receive one or more secrets, then determine the secrets, or secret classes, legitimately needed by that particular virtual asset, then collect the secrets determined to be legitimately needed by the particular virtual asset, and then provide the virtual asset access to only these secrets.

SUMMARY

In accordance with one embodiment, a method and system for distributing secrets includes providing secrets data representing one or more secrets, such as but not limited to, passwords, encryption keys, and digital certificates that are required to access associated resources, such as but not limited to, data and databases, communications channels, and external and internal services. In one embodiment, secrets distribution policy data is provided representing one or more secrets distribution factors used to control the distribution of the one or more secrets.

In one embodiment, when secrets request data is received requesting secrets data necessary to access one or more associated resources from a requesting virtual asset, the requesting virtual asset is authenticated to determine if the requesting virtual asset is eligible to receive any of the secrets data.

In one embodiment, once the virtual asset is authenticated, requesting virtual asset profile data associated with the requesting virtual asset is obtained. In one embodiment, the requesting virtual asset profile data is analyzed using one or more of the one or more secrets distribution factors to determine what secrets, or classes of secrets, the requesting virtual asset legitimately needs. Authorized secrets data for the requesting virtual asset representing one or more authorized secrets of the one or more secrets represented in the secrets data is then generated. In one embodiment, the requesting virtual asset is then provided access to the authorized secrets data for the requesting virtual asset.

Figure 1:
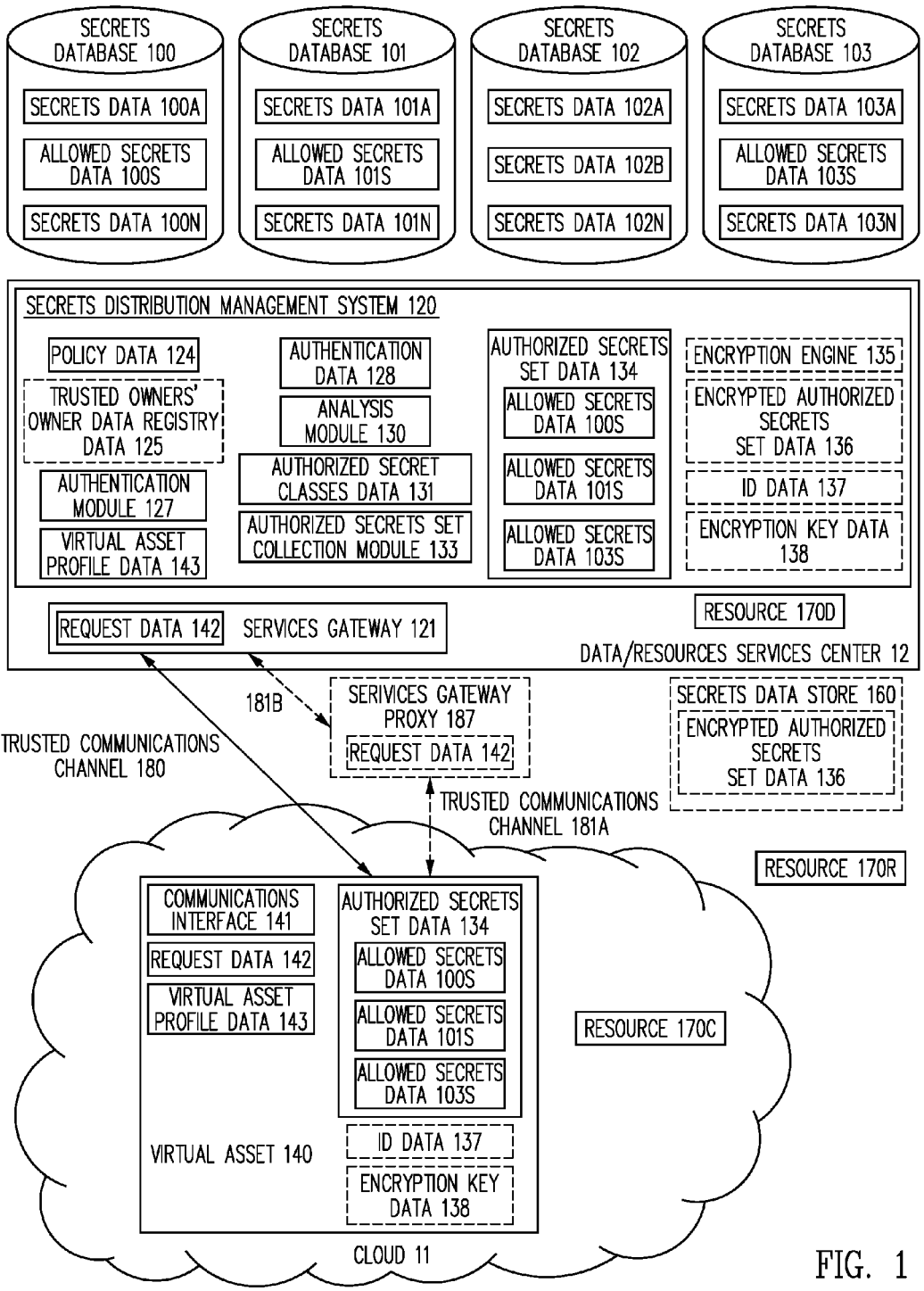
FIG. 1 is a functional block diagram showing the interaction of various elements for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a method and system for distributing secrets includes a process for distributing secrets implemented, at least in part, by one or more computing systems.

As used herein, the term "computing system", includes, but is not limited to, a server computing system; a workstation; desktop computing system; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In one embodiment, one or more computing systems are connected by one or more communications channels, and/or distributed computing system networks, such as, but not limited to: a public cloud; a private cloud; a virtual private cloud (VPN); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In accordance with one embodiment, secrets data representing one or more secrets is obtained and/or provided. As used herein, the term "secrets" includes any information, credentials, or other devices, necessary to access one or more resources and/or computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to control access to various systems, resources, file systems and any other persistent storage, and data and that are required for such access, as discussed herein, and/or as known/available in the art at the time of filing, and/or as developed/made available after the time of filing.

In one embodiment, the secrets represented by the secrets data are of one or more types, or classifications, of secrets. In various embodiments, the secrets are classified according to the type of resource the secret is used to access. For example, usernames, passwords, and passphrases, necessary to access various applications would be classified as user account access secrets, while digital certificates associated with Secure Socket Layer (SSL) communications channels would be classified as communication secrets, and encryption keys would be classified as encryption secrets. In addition, the secrets represented by the secrets data can be classified according to whether the secrets provide access to internal resources, such as databases and data in a data center, or access to external resources such as services offered through a cloud or the Internet.

In one embodiment, the different classes of secrets are provided by, and/or originate from, different secret sources. In one embodiment, the secrets data representing the different classes of secrets are maintained in separate secret databases or data stores. In one embodiment, the secrets data is provided, and/or maintained by, and/or on behalf of, a data/resources services center, such as a data center, providing data and/or resources to distributed computing systems, such as cloud-based systems and resources. Consequently, in one embodiment, the secrets data includes data representing one or more classes of secrets used to control access to one or more types of resources associated with the classes of secrets by one or more entities, such as a requesting virtual asset, residing physically or logically outside the data/resources services center where the secrets data is maintained, and/or accessed.

FIG. 1 is a functional diagram of the interaction of various elements associated with one embodiment of the method and system for distributing secrets discussed herein. Of particular note, the various elements in FIG. 1 are shown for illustrative purposes as being associated with specific systems such as cloud 11 and data/resources services center 12. However, the exemplary placement of the various elements within these systems in FIG. 1 is made for illustrative purposes only and, in various embodiments, any individual element shown in FIG. 1, or combination of elements shown in FIG. 1, can be implemented and/or deployed on any of one or more various systems shown, and/or architectural or infrastructure components, such as one or more hardware systems, one or more software systems, one or more data centers, more or more clouds or cloud types, one or more third party service capabilities, or any other architectural and/or infrastructure components as discussed herein, and/or as known in the art at the time of filing, and/or as developed/made available after the time of filing.

In addition, the elements shown in FIG. 1, and/or the systems and architectural and/or infrastructure components deploying the elements shown in FIG. 1, can be under the control of, or otherwise associated with, various parties or entities, or multiple parties or entities, such as, but not limited to, the owner of a data center keeping or accessing the secrets data, a party and/or entity providing all or a portion of a cloud-based environment, the owner or a provider of a service, the owner or provider of one or more resources accessible using the secrets, and/or any other party and/or entity providing one or more functions, and/or any other party and/or entity as discussed herein, and/or as known in the art at the time of filing, and/or as made known after the time of filing.

In FIG. 1 the secrets data is represented by secrets data 100A, allowed secrets data 100S, secrets data 100N included in secrets database 100; secrets data 101A, allowed secrets data 101S, secrets data 101N, included in secrets database 101; secrets data 102A, secrets data 102B, secrets data 102N, included in secrets database 102; and secrets data 103A, allowed secrets data 103S, secrets data 103N included in secrets database 103. In one embodiment, each of secrets databases 100, 101, 102, and 103 is a source of a different class of secrets that is part of, or accessible by, data/resources services center 12 and secrets distribution management system 120.

As shown in FIG. 1, the secrets represented in the secrets data are used to access various resources such as resource 170D, residing in data/resources service center 120; and/or resource 170R, residing at a location outside of data/resources service center 120 and cloud 11; and/or resource 170C, residing within cloud 11. In FIG. four secrets databases, 100, 101, 102, and 103, are illustratively shown. However, in various embodiments, any number of secrets databases are utilized and/or accessed.

Given the nature of the secrets represented by the secrets data, it is fundamental that the secrets data be kept secure and only be released to entities, such as virtual assets, that are authenticated and legitimately qualified to receive secrets, and the specific classes of secrets. To this end, secrets distribution policy data representing secrets distribution policy and one or more secrets distribution factors used to control the distribution of the one or more secrets, and classes of secrets, is generated and provided.

In one embodiment, each virtual asset is assigned a given role. In one embodiment, as part of the secrets distribution policy, the secrets that can be provided to each role is defined. In one embodiment, these roles are defined in secrets metadata.

In one embodiment, each virtual asset is assigned a single role. However, many virtual assets can be assigned, and play, the same role. For example, a "POD1-WEB-Instance".

In other embodiments, a given virtual asset can play multiple roles, for example, a Web Instance can have a role called "web-instance" and same instance can have the role of "cache-server".

In one embodiment, the secrets distribution factors include one or more checks or tests to be performed on virtual assets requesting secrets data that allow for a determination as to what secrets the requesting virtual asset legitimately needs. A more detailed discussion of specific secrets distribution factors is provided below.

In various embodiments, the secrets distribution policy data is open-endedly defined such that the secrets distribution policy, and/or secrets distribution factors, can be defined by the one or more parties associated with the distribution of the secrets, such as, but not limited to, the owner of a data center keeping or accessing the secrets data, the owner or provider of a cloud, the owner or a provider of a service, the owner or provider of one or more resources accessible using the secrets data, and/or any other party legitimately authorized to control the distribution of secrets. In this way, using the disclosed process for distributing secrets, the secrets distribution policy can be tailored to the specific needs of the one or more parties associated with the distribution of the secrets. In addition, the secrets distribution policies, and/or secrets distribution factors, can be added, modified, or deleted, as needed to meet the needs of the one or more parties associated with the distribution of secrets.

Referring back to FIG. 1, the secrets distribution policy data, including one or more secrets distribution factors, is represented by policy data 124, shown in the one illustrative example of FIG. 1 as residing in secrets distribution management system 120 of data/resources services center 12.

In one embodiment, a secrets request is received from a requesting virtual asset for one or more secrets required to obtain access to one or more resources.

As used herein, the term "virtual asset" includes any virtualized entity or resource, and/or actual, or "bare metal" resources requiring access to various resources, and types of resources. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or mobile devices, remote sensors, laptops, desktops, point-of-sale devices, ATMs, electronic voting machines requiring access to various resources, and/or types of resources, located within a data center, within the cloud, and/or any other physical or logical location, as discussed herein, and/or as known/available in the art at the time of filing, and/or as developed/made available after the time of filing.

As discussed in more detail below, when a virtual asset is initiated, or created, in a cloud environment, the virtual asset typically requires access to one or more resources in the cloud, external to the cloud, and/or in one or more data centers. As also discussed in more detail below, in order to access these resources the virtual assets typically must obtain secrets data representing one or more secrets required to access the needed resources. Herein, a virtual asset attempting to access a resource, and therefore requesting secrets data, is referred to as a "requesting virtual asset."

In one embodiment, the secrets request is received from the requesting virtual asset in the form of secrets request data. In one embodiment, the secrets request data is received from the requesting virtual data at a services gateway associated with a data/resources services center, e.g., a data center, where the secrets data is maintained, and/or through which the secrets data is accessed. In some embodiments, the requesting virtual asset is configured such that when the virtual asset is initiated, code built into the virtual asset image is used to contact the services gateway directly. In one embodiment, the secrets request data is received from the requesting virtual asset at the services gateway through a trusted communication channel such as, for example, an authenticated Secure Sockets Layer (SSL) communication channel.

In one embodiment, the secrets request data is received from the requesting virtual asset through a services gateway proxy that, in turn, is communicatively coupled to the services gateway. In one embodiment, the secrets request data is received from the requesting virtual asset at the services gateway proxy through a trusted communication channel such as, for example, an authenticated SSL communication channel. In one embodiment, the services gateway proxy is also connected to the services gateway by a trusted communication channel, such as an authenticated SSL communication channel.

In one embodiment the secrets request data from the requesting virtual asset is a listing or set of the requesting virtual asset's specific parameters that will be used by services gateway to verify the provided parameters by making API calls to the owner or provider of a cloud service.

Referring back to FIG. 1, virtual asset 140 is shown as residing in cloud 11 and including secrets request data represented by request data 142 in FIG. 1 which is provided in one example, to services gateway 121 through communications interface 141 and trusted communications channel 180, in one embodiment, an SSL channel authenticated by authentication module 127. In an alternative example, request data 142 is provided to services gateway proxy 187 via communications interface 141 and trusted communications channel 181A. In this specific example, services gateway proxy 187 then provides request data 142 to services gateway 121 via trusted communications channel 181B.

In various embodiments, the secrets request data includes requests for certain classes of secrets or specific secrets associated with specific resources. In some embodiments, the secrets request data is actually a request for access to resources that require secrets so that the request to access the resources is, de-facto, a request for secrets data.

In one embodiment, the secrets request data is forwarded from the services gateway to a secrets distribution management service/system. In one embodiment, the secrets distribution management service/system then obtains requesting virtual asset profile data associated with the requesting virtual asset.

In various embodiments, the virtual asset profile data associated with the requesting virtual asset includes, but is not limited to, owner identification data associated with an owner of the requesting virtual asset, such as the account number of an owner of the virtual asset; data indicating the type of requesting virtual asset such as whether the requesting virtual asset is a server instance, a data store, and whether the requesting virtual asset is associated with a specific location or tier, such as a web tier, and/or logically requires access to internal resources or external resources, such as the Internet, etc.; data indicating any special capabilities or modules associated with the requesting virtual asset; data indicating the size and number of resources allocated to the requesting virtual asset; data indicating how long the requesting virtual asset has existed or has been running; data indicating where the virtual asset resides and/or is being initiated, such as in a subnet of a Virtual Private Cloud (VPC), or in a public cloud, etc.; data indicating security parameters and procedures associated with the requesting virtual asset; an instance ID; an instance type; an instance IP address; an authorization role assigned to a virtual asset by the owner or provider of a cloud service; and/or any other virtual asset profile data desired and defined by any party legitimately associated with the distribution of secrets.

As with the secrets distribution policy data, in various embodiments, the requesting virtual asset profile data to be obtained is open-endedly defined such that the virtual asset profile data obtained can be defined by the one or more parties associated with the distribution of the secrets, such as, but not limited to, the owner of a data center keeping or accessing the secrets data, the owner or provider of a cloud, the owner or a provider of a service, the owner or provider of one or more resources accessible using the secrets data, and/or any other party legitimately authorized to control the distribution of secrets. In this way, using the disclosed process for distributing secrets, the requesting virtual asset profile data obtained, and therefore the requesting virtual asset profile data available for analysis, can be tailored to the specific needs of the one or more parties associated with the distribution of the secrets. In addition, portions of the requesting virtual asset profile data to be obtained can be added, modified, or deleted, as needed to meet the needs of the one or more parties associated with the distribution of secrets.

Referring back to FIG. 1, the requesting virtual asset profile data, represented by virtual asset profile data 143, is obtained by secrets distribution management system 120 via services gateway 121 and trusted communications channel 180, or services gateway proxy 187 and trusted communications channels 181A and 181B, and communications interface 141.

In one embodiment, once the requesting virtual asset profile data is obtained, the requesting virtual asset is authenticated to confirm that the requesting virtual asset is a legitimate entity and is eligible to receive any portion of secrets data, i.e., any secrets, at all.

Referring back to FIG. 1, the authentication process is coordinated using authentication module 127, as discussed below, to generate authentication data 128 indicating the virtual asset is a legitimate entity and is eligible to receive secrets data.

In one embodiment, the requesting virtual asset is authenticated by analyzing the requesting virtual asset profile data to determine an identification number associated with the owner of the requesting virtual asset. Then the identification number associated with the owner of the requesting virtual asset is compared with a registry or listing of identification numbers associated with known and trusted owners. In addition, in many cases, the identification number associated with the owner of the requesting virtual asset is also linked to data indicating all virtual assets associated with that owner. Consequently, by determining the identification of the owner of the requesting virtual asset, a determination can be made as to whether the requesting virtual asset itself is a legitimate virtual asset.

As a specific illustrative example, an owner's account number is compared with a registry or listing of trusted owners' account numbers. As an even more specific illustrative example, an owner's account number with a cloud provider is compared with a list of trusted owners' account numbers to determine if the owner of the requesting virtual asset is a trusted entity. Since, as noted, an owner's account number is typically linked to data indicating all virtual assets associated with the account, comparing the owner's account number with a registry of trusted account numbers allows for a determination to be made at least as to whether the requesting virtual asset is an asset that should be provided some portion of the secrets data, i.e., one or more secrets represented by the secrets data.

Referring back to FIG. 1, the registry or listing of identification numbers associated with known and trusted owners is represented by trusted owners' owner data registry data 125.

In one embodiment, the requesting virtual asset is authenticated by analyzing the requesting virtual asset profile data to determine whether the requesting virtual asset is in compliance with one or more security policies. Using this authentication parameter, an initial determination can be made at least as to whether the requesting virtual asset has sufficient security mechanisms/features in place, and/or associated with it, to ensure not only that the requesting virtual asset is authorized to receive such secrets, but that the secrets data itself will be secure once it is provided to the requesting virtual asset.

As a specific illustrative example, if security policies dictate that virtual assets receiving certain secrets must be part of a subnet of a virtual public cloud, a determination that this is indeed the case for a requesting virtual asset is made before any secrets data is provided to a requesting virtual asset.

In one embodiment, the requesting virtual asset is authenticated using any authentication means, processes, methods, and/or procedures, or combinations of authentication means, processes, methods, and/or procedures, as discussed herein, and/or as known in the art/available at the time of filing, and/or as developed/made available after the time of filing.

In one embodiment, once the requesting virtual asset is authenticated and it is determined that the requesting virtual asset is eligible to receive some form of secrets, the requesting virtual asset profile data is further analyzed to determine what classes of secrets the requesting virtual asset legitimately needs, and therefore is eligible to receive.

As noted above, in one embodiment, the secrets distribution policy data includes data representing secrets distribution factors. As also noted above, the secrets distribution factors include one or more checks or tests to be performed on requesting virtual assets profile data to determine what secrets, and/or classes of secrets, the requesting virtual asset legitimately needs and is authorized to receive.

Specific examples of secrets distribution factors include but are not limited to, making a determination as to whether owner identification data associated with the owner of the requesting virtual asset is included in a registry of trusted owners' owner identification data; if this determination has not already been made as part of the authentication process discussed above.

As noted above, using this secrets distribution factor a registry of trusted owners' owner identification data such as, in one illustrative example, an owner's account number, is compared with a registry or listing of trusted owners' account numbers. As a more specific illustrative example, an owner's account number with a cloud provider is compared with a list of trusted owner's account numbers to determine if the requesting virtual asset is a trusted entity. In addition, since generally an owner's account number includes data indicating all virtual assets associated with the account, comparing the owner's account number with a registry of trusted account numbers allows for a determination to be made about the type of requesting virtual asset and what types of secrets that requesting virtual asset might legitimately need.

In addition, an analysis of the account number associated with an owner of the requesting virtual asset can also provide information regarding a budget associated with that account number and therefore what resources the owner of the requesting virtual asset can afford to access on behalf of the requesting virtual asset. Consequently, this data also can be used to determine what classes of secrets, or individual secrets, the requesting virtual asset is eligible to receive.

As also noted above, another specific illustrative example of a secrets distribution factor includes making a determination as to security associated with the requesting virtual asset, and whether the requesting virtual asset is in compliance with one or more security policies. Using this secrets distribution factor, an initial determination can be made at least as to whether the requesting virtual asset has sufficient security mechanisms/features in place, and/or associated with it, to receive certain classes of secrets. For instance, there may be a requirement that in order to receive secrets classified as encryption related secrets, a higher level of security must be in place on the requesting virtual asset than that required to receive passwords to a social networking system. Consequently, this data can be used to determine what classes of secrets, or individual secrets, the requesting virtual asset is eligible to receive.

Another specific illustrative example of a secrets distribution factor includes making a determination as to how long the requesting virtual asset has currently been operating. Using this secrets distribution factor a determination can be made as to whether the requesting virtual assets request for secrets data is temporally logical.

For instance, as noted above, specific examples of virtual assets include instances generated within a cloud computing environment. In general, an instance is a virtual server generated within a cloud computing environment that includes allocated operating systems, processing power, data storage, and communication systems. Instances can generally be created and destroyed within the cloud as needed.

When instances are first initiated, i.e., created or re-created, in the cloud, the instance typically needs to access various resources in order to perform its intended task. To this end, the instance also typically requires one or more secrets in order to access the required resources. Consequently, the most logical time for an instance, or other virtual asset, to have need for, and to request, secrets data is when the instance, or other virtual asset, is being initiated. Typically, it is at this point in the virtual asset's life that it requires the secrets data in order to access the resources it needs to perform its function.

Consequently, when a requesting virtual asset makes a secrets data request after the requesting virtual asset has been in existence for a threshold period of time, this can be an indication that the requesting virtual asset is not a legitimate recipient of secrets data. However in some cases, a virtual asset can have a legitimate need to obtain secrets data after that virtual asset has been in existence for significant amount of time. In these cases, this particular secrets distribution factor is either not used, or is given a lower weight or priority.

Another specific illustrative example of a secrets distribution factor includes a determination of the number or resources associated with the requesting virtual asset. Using this secrets distribution factor a determination is made as to the number of resources that are already allocated to the requesting virtual asset. For instance, a requesting virtual asset that currently has large amounts of processing power, data storage capacity, and perhaps multiple instances, associated with it, is naturally given greater scrutiny than a requesting virtual asset having minimal resources. As a specific example, when large amounts of resources associated with a requesting virtual asset are identified, multiple secret distribution factors may be applied to that virtual asset before secrets data is provided to the virtual asset.

Another specific illustrative example of a secrets distribution factor includes a determination of modules or capabilities associated with the requesting virtual asset. By examining the capabilities, and/or special modules or functions, associated with, and/or performed by a requesting virtual asset, a determination can be made as to what classes of secrets the requesting virtual asset may need. For instance, a requesting virtual asset that includes a module for processing financial data is likely to have a legitimate need for access to secrets related to accessing financial data from a data center. In contrast, a specialized requesting virtual asset that includes a module associated with analyzing genome data, or includes resources that are directed to processing large amounts of empirical data, is less likely to have a legitimate need for access to secrets related to accessing financial data.

Another specific illustrative example of a secrets distribution factor includes a determination of the type of requesting virtual asset and the legitimate access requirements of that type of requesting virtual asset. For instance, a requesting virtual asset that is related to a database is considered potentially more problematic than a requesting virtual asset that is a single instance within a cloud computing environment. Consequently, when a determination is made that the requesting virtual asset is a database related asset, that requesting virtual asset is held to a higher security standard and subjected to more secrets distribution factor analysis.

As noted above, in one embodiment, each virtual asset is assigned a given role. In one embodiment, as part of the secrets distribution policy, the secrets that can be provided to each role is defined. In one embodiment, these roles are defined in secrets meta-data. As a result, another specific illustrative example of a secrets distribution factor includes determining an authorization role assigned to the virtual asset by the owner or provider of a cloud service.

In various embodiments, as indicated above, the number and types of secret distribution factors to be applied to the requesting virtual asset is determined, at least in part, based on various features of the requesting virtual asset as indicated in the analysis of requesting virtual asset profile data. As also noted above, both the secrets distribution policy data, including the secrets distribution factors, and the virtual asset profile data to be obtained, are open-ended and can be defined by the one or more parties associated with the distribution of the secrets. Consequently, the type and number of secret distribution factors applied to a requesting virtual asset is also open-ended.

In one embodiment, as a result of the analysis of the requesting virtual assets profile data using the secrets distribution policy data, including the secret distribution factors, a determination is made as to what classes of secrets, or specific secrets, the requesting virtual asset is eligible to receive. In one embodiment, the result of this determination is the generation of authorized secret classes data indicating the authorized classes of secrets, and/or specific secrets, the requesting virtual asset is eligible to receive.

Referring back to FIG. 1, authorized secret classes data the analysis of the requesting virtual assets profile data using the secrets distribution policy data, represented as policy data 124 in FIG. 1, is performed under the direction of analysis module 130 which generates authorized secret classes data 131.

In one embodiment, data representing one or more secrets in the secrets data is obtained for the requesting virtual asset in accordance with the authorized secret classes data. In one embodiment, the data representing one or more secrets is obtained from one or more secrets databases through a secrets distribution management system that resides, in one embodiment, at the data/resources service center, e.g., the data center.

In one embodiment, the data representing the one or more secrets determined to be appropriate to provide to the requesting virtual asset is collected into a single set of authorized secret set data that includes all of the secrets that it has been determined the requesting resource asset legitimately requires.

Referring back to FIG. 1, data representing one or more secrets, shown as allowed secrets data 100S, allowed secrets data 101S, and allowed secrets data 103S, is collected from secrets databases 100, 101, and 103 under the supervision of authorized secret set collection module 133 and included in allowed secrets set data 134.

In one embodiment, once the authorized secret set data is obtained, the authorized secret set data is provided to the requesting virtual asset. In one embodiment, the authorized secret set data is provided to the requesting virtual asset via a trusted communications channel, such as an authenticated SSL communications channel, and/or through the services gateway, and/or a services gateway proxy, if present.

Referring back to FIG. 1, allowed secrets set data 134 is shown as residing in virtual asset 140 after having been received from secrets distribution management system 120 of data/resources services center 12.

In one embodiment, once the requesting virtual asset receives the authorized secret set data, the requesting virtual asset uses the secrets contained in the authorized secret set data to obtain access to the resources it needs to perform its designated tasks.

In one embodiment once the authorized secret set data is obtained, the authorized secret set data is encrypted, in one embodiment by an encryption engine located at the data/resources services center, e.g., the data center. In one embodiment, the encrypted authorized secret set data is assigned authorized secret set data identification data and is then transferred/transmitted to a secrets data store where it is stored pending access by the requesting virtual asset.

Referring back to FIG. 1, authorized secret set data 134 is encrypted by encryption engine 135 to generate encrypted authorized secret set data 136 and assigned authorized secret set data identification data, represented as ID data 137. Also shown is encryption key data 138 capable of decrypting encrypted authorized secret set data 136 to provide authorized secret set data 134 to the provider of encryption key data 138. As seen in FIG. 1, encrypted authorized secret set data 136 is provided to secrets data store 160.

In one embodiment, data representing the encryption key, i.e., a single secret, is then provided to the requesting virtual asset along with the identification data for the encrypted authorized secret set data. Then, in one embodiment, the requesting virtual asset uses the identification data to identify the desired encrypted authorized secret set data in the secret data store and provides the encryption key data to access and decrypt the authorized secrets.

Referring back to FIG. 1, ID data 137 and encryption key data 138 are shown as residing in virtual asset 140 as received from secrets distribution management system 120 and data/resources services center 12. In one embodiment, ID data 137 is used by virtual asset 140 to identify encrypted authorized secret set data 136 and encryption key data 138 is used by virtual asset 140 to decrypt encrypted authorized secret set data 136 to yield authorized secret set data 134.

In one embodiment, the requesting virtual asset uses the secrets contained in the authorized secret set data to obtain access to the resources it needs to perform its designated tasks.

In one embodiment, the secrets data store is a data store or database, or other data storage mechanism, located outside the data center and, in one embodiment, at a physical location closer to the requesting virtual asset. In this way, in some embodiments, encrypted authorized secret set data is pre-generated for specific types, and/or classes, of virtual assets and then pre-deployed to a local secrets data store to await a secrets request data from a requesting virtual asset of the particular type, or class, associated with the encrypted authorized secret set data. In one embodiment, once the secrets request data is received from a requesting virtual asset of the particular type, or class, associated with the pre-deployed encrypted authorized secret set data, the requesting virtual asset is provided the identification data associated with the pre-deployed encrypted authorized secret set data and the encryption key. Then, as above, the requesting virtual asset uses the secrets included in the authorized secretive data to access the resources it needs to perform its function. However, in this case, the latencies involved in actually collecting the authorized secret set data and transmitting the entire set of authorized secret set data to the requesting virtual asset are avoided.

Figure 2A:
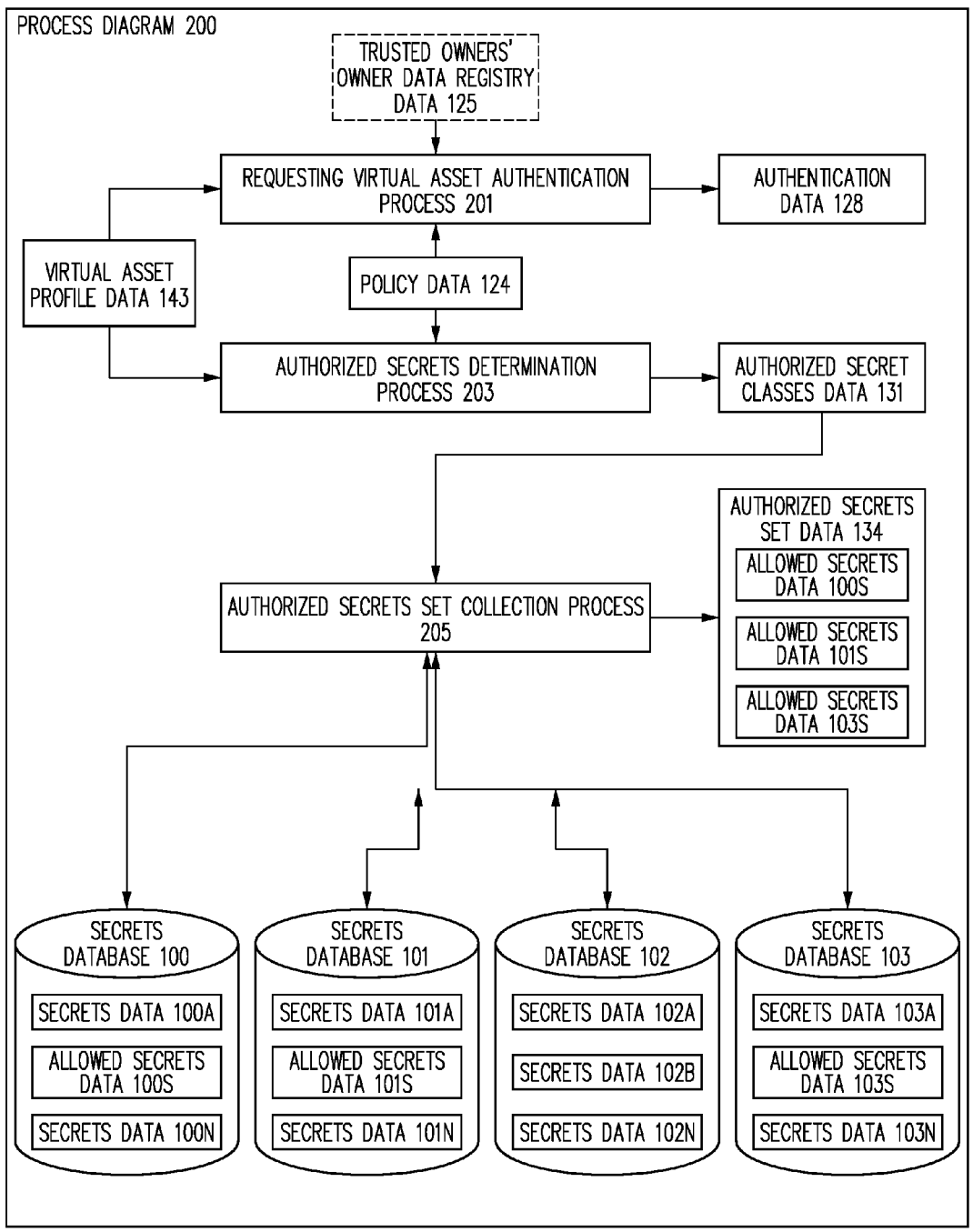
FIG. 2A is a process diagram of part of a process for distributing secrets in accordance with one embodiment.

FIG. 2A is a process diagram showing one illustrative example of the interaction of various illustrative processes, or sub-processes, 201, 203, and 205, used to implement all, or part of, a process for distributing secrets, such as exemplary processes 300 (FIG. 3) and 400 (FIG. 4) discussed herein.

Figure 2B:
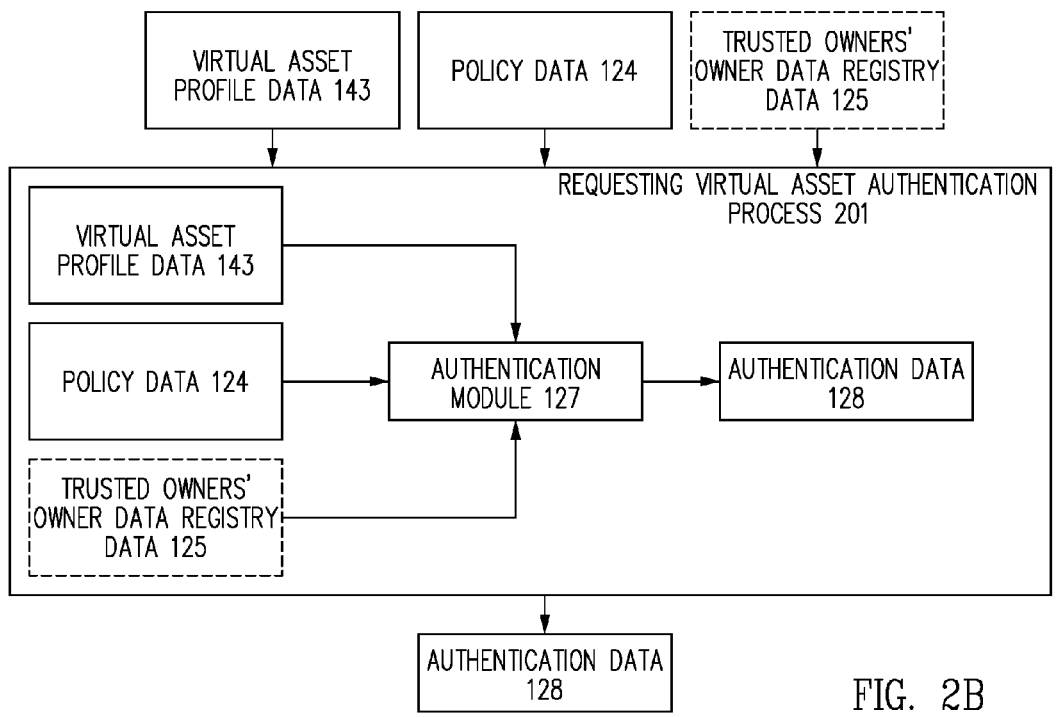
FIG. 2B shows a requesting virtual asset authentication process in accordance with one embodiment.
Figure 2C:
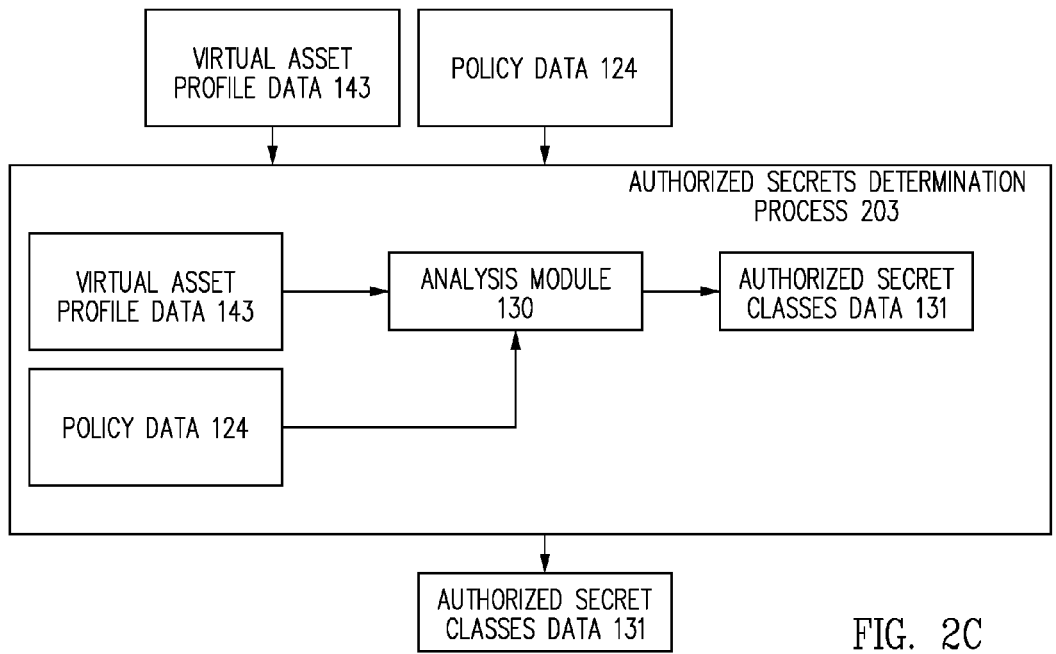
FIG. 2C shows an authorized secrets determination process in accordance with one embodiment.
Figure 2D:
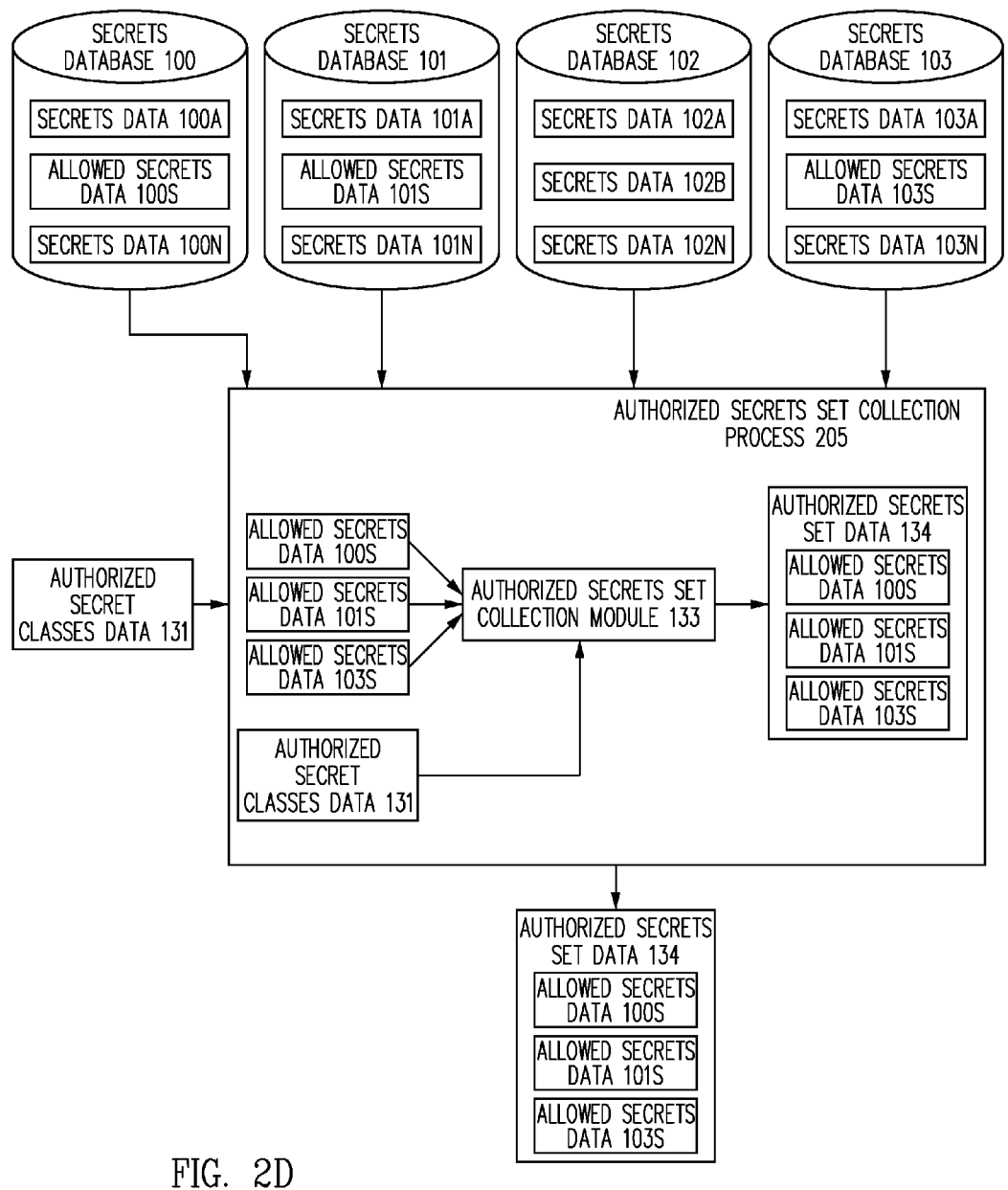
FIG. 2D shows an authorized secrets set collection process in accordance with one embodiment.

FIGS. 2B, 2C, and 2D show illustrative examples of processes 201, 203, and 205 in accordance with one embodiment.

Referring to FIG. 1, FIG. 2A, FIG. 2B, FIG. 2C, and FIG. 2D together, virtual asset profile data 143, policy data 124, and, optionally, trusted owners owner data registry data 125, are provided as input to requesting virtual asset authentication process 201 which generates authentication data 128.

FIG. 2B shows requesting virtual asset authentication process 201 in more detail.

As seen in FIG. 2B, virtual asset profile data 143, policy data 124, and, optionally, trusted owners owner data registry data 125 are used as input data to authentication module 127 which then transforms virtual asset profile data 143, policy data 124, and, optionally, trusted owners owner data registry data 125 into authentication data 128 by one or more of the methods and processes discussed above, and/or any other method, process, procedure, or mechanism, or combinations thereof, as discussed herein, and/or as known in the art at the time of filing, and/or as developed after the time of filing.

For instance, as discussed herein, in one embodiment, authentication module 127 analyzes virtual asset profile data 143, in one embodiment using one or more secret distribution factors included in policy data 124, and, in one embodiment, a trusted owners identification registry indicated in trusted owners owner data registry data 125, to determine if the requesting virtual asset is a legitimate recipient of one or more secrets data. If authentication module 127 determines that the requesting virtual asset is legitimate, this is indicated in authentication data 128 generated by authentication module 127.

Referring back to FIG. 1, FIG. 2A, FIG. 2B, FIG. 2C, and FIG. 2D together, virtual asset profile data 143 and policy data 124 are provided as input to authorized secrets determination process 203 which generates authorized secret classes data 131. FIG. 2C shows authorized secrets determination process 203 in more detail.

As seen in FIG. 2C, virtual asset profile data 143 and policy data 124 are used as input data to analysis module 130 which transforms virtual asset profile data 143 and policy data 124 into authorized secret classes data 131 by one or more of the methods and processes discussed above, and/or any other method, process, procedure, or mechanism, or combinations thereof, as discussed herein, and/or as known in the art at the time of filing, and/or as developed after the time of filing.

For instance, as discussed herein, in one embodiment, analysis module 130 uses the secrets distribution factors indicated in policy data 124 to analyze virtual asset profile data 143 and determine what classes of secrets the requesting virtual asset legitimately needs to perform its functions. The results of this analysis is then used to generate authorized secret classes data 131.

Referring back to FIG. 1, FIG. 2A, FIG. 2B, FIG. 2C, and FIG. 2D together, in one embodiment, authorized secret class data 131 and secrets data from secrets database 100, secrets database 101, secrets database 102, and secrets database 103 are provided as input to authorized secrets set collection process 205 which generates authorized secrets set data 134, including allowed secrets data 100S, allowed secrets data 101S, and allowed secrets data 103S. FIG. 2D shows authorized secrets set collection process 205 in more detail.

As seen in FIG. 2D, authorized secret class data 131 and secrets data from secrets database 100, secrets database 101, secrets database 102, and secrets database 103 are used as input data to authorized secrets set collection module 133 which transforms at least part of authorized secret class data 131 and secrets data from secrets database 100, secrets database 101, secrets database 102, and secrets database 103 into authorized secrets set data 134, including allowed secrets data 100S, allowed secrets data 101S, and allowed secrets data 103S by one or more of the methods and processes discussed above, and/or any other method, process, procedure, or mechanism, or combinations thereof, as discussed herein, and/or as known in the art at the time of filing, and/or as developed after the time of filing.

For instance, as discussed herein, in one embodiment, authorized secrets set collection module 133 obtains allowed secrets data 100S from secrets database 100, allowed secrets data 101S from secrets database 101, and allowed secrets data 103S from database 103 in accordance with the guidelines of authorized secret classes data 131. In one embodiment, authorized secret set collection module 133 then includes allowed secrets data 100S, allowed secrets data 101S, and allowed secrets data 103S in generated authorized secret set data 134.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Using the method and system for providing secrets disclosed herein, requesting virtual asset profile data associated with a virtual asset requesting secrets is used to authenticate the requesting virtual asset and then to determine the classes of secrets that requesting virtual asset legitimately needs. Then a set of secrets determined to be legitimately required by the requesting virtual asset is created and sent to the requesting virtual asset. Consequently, using the method and system for providing secrets disclosed herein, a virtual asset can be provided the secrets it needs to perform its tasks in a comprehensive and highly automated manner while still maintaining the security of the secrets and the resources protected by those secrets.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a method and system for distributing secrets includes providing secrets data representing one or more secrets, such as but not limited to, passwords, encryption keys, and digital certificates that are required to access associated resources, such as but not limited to, data and databases, communications channels, and external and internal services. In one embodiment, secrets distribution policy data is provided representing one or more secrets distribution factors used to control the distribution of the one or more secrets.

In one embodiment, when secrets request data is received requesting secrets data necessary to access one or more associated resources from a requesting virtual asset such as, but not limited to, a virtual machine, virtual server instance, a database or storage entity, the requesting virtual asset is authenticated to determine if the requesting virtual asset is eligible to receive any of the secrets data.

In one embodiment, once the virtual asset is authenticated, requesting virtual asset profile data associated with the requesting virtual asset is obtained. In one embodiment, the requesting virtual asset profile data is analyzed using one or more of the one or more secrets distribution factors to determine what secrets, or classes of secrets the requesting virtual asset legitimately needs. Authorized secrets data for the requesting virtual asset representing one or more authorized secrets of the one or more secrets represented in the secrets data is then generated. In one embodiment, the requesting virtual asset is then provided access to the authorized secrets data for the requesting virtual asset.

Figure 3:
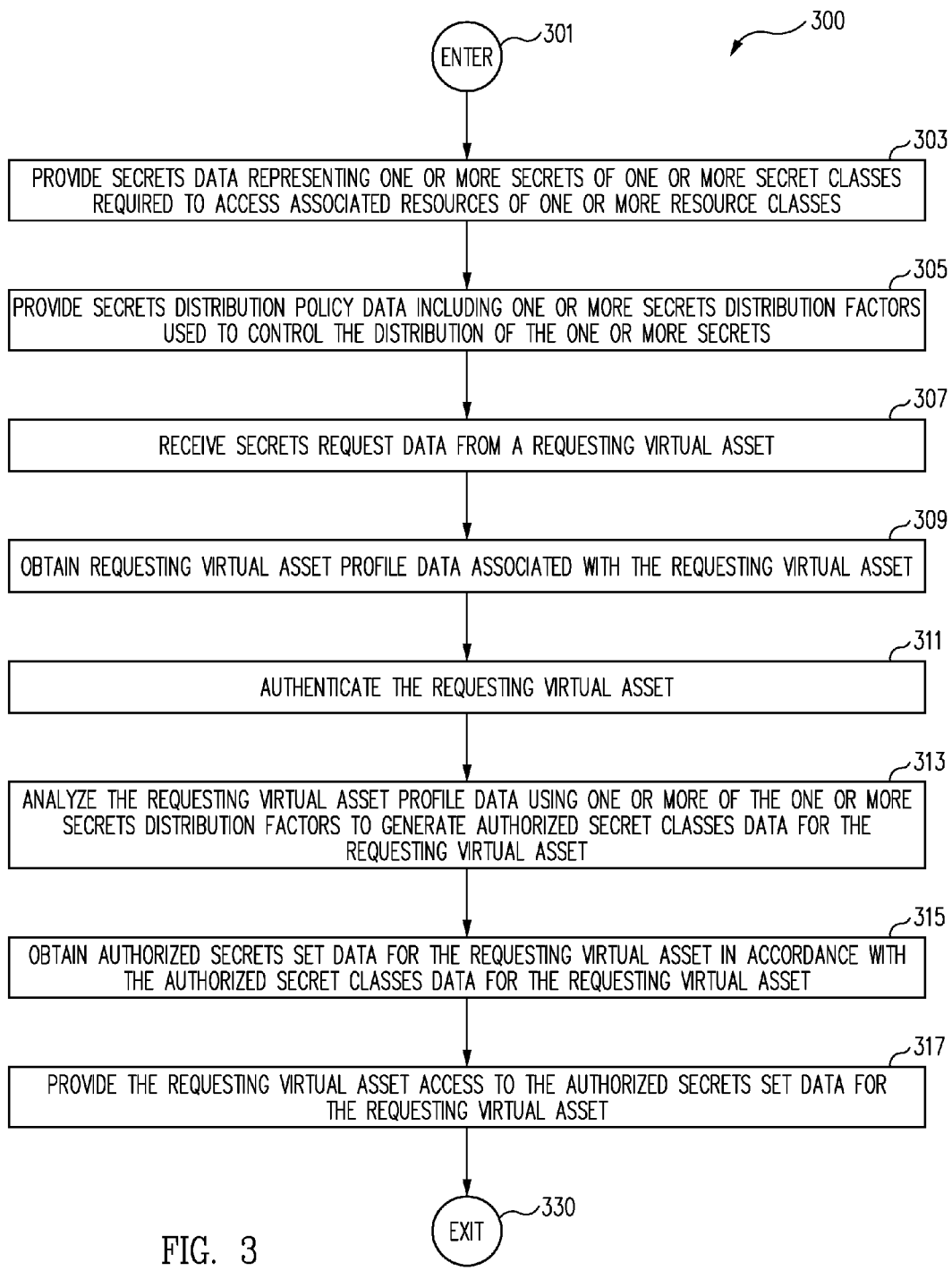
FIG. 3 is a flow chart depicting a process for distributing secrets in accordance with one embodiment.

FIG. 3 is a flow chart of a process 300 for distributing secrets in accordance with one embodiment. In one embodiment, process 300 for distributing secrets begins at ENTER OPERATION 301 of FIG. 3 and process flow proceeds to PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 303.

In one embodiment, at PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 303 access to secrets data representing one or more secrets is obtained and/or provided.

As noted above, herein, the term "secrets" includes any information, credentials, or other devices, necessary to access one or more resources and/or computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to control access to various systems, resources, file systems and any other persistent storage, and data and that are required for such access, as discussed herein, and/or as known/available in the art at the time of filing, and/or as developed/made available after the time of filing.

In one embodiment, the secrets represented by the secrets data of PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 303 are of one or more types, or classifications, of secrets. In various embodiments, the secrets are classified according to the type of resource the secret is used to access.

For example, usernames, passwords, and passphrases necessary to access various applications would be classified as user account access secrets, while digital certificates associated with Secure Socket Layer (SSL) communications channels would be classified as communication secrets, and encryption keys would be classified as encryption secrets. In addition, the secrets represented by the secrets data of PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 303 can be classified according to whether the secrets provide access to internal resources, such as databases and data in a data center, or access to external resources such as services offered through a cloud or the Internet.

In one embodiment, the different classes of secrets of PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 303 are provided by, and/or originate from, different secret sources. In one embodiment, the secrets data representing the different classes of secrets of PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 303 are maintained in separate secret databases or data stores. In one embodiment, the secrets data is provided, and/or maintained by, and/or on behalf of, a data/resources services center, such as a data center, providing data and/or resources to distributed computing systems, such as cloud-based systems and resources.

Consequently, in one embodiment, the secrets data of PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 303 includes data representing one or more classes of secrets used to control access to one or more classes/types of resources associated with the classes of secrets by one or more entities, such as a requesting virtual asset, residing physically or logically outside the data/resources services center where the secrets data is maintained, and/or accessed.

In one embodiment, once access to secrets data representing one or more secrets is obtained and/or provided at PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 303, process flow proceeds to PROVIDE SECRETS DISTRIBUTION POLICY DATA INCLUDING ONE OR MORE SECRETS DISTRIBUTION FACTORS USED TO CONTROL THE DISTRIBUTION OF THE ONE OR MORE SECRETS OPERATION 305.

Given the nature of the secrets represented by the secrets data of PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 303, it is fundamental that the secrets data be kept secure and only be released to entities, such as virtual assets, that are authenticated and legitimately qualified to receive secrets, and the specific classes of secrets.

To this end, at PROVIDE SECRETS DISTRIBUTION POLICY DATA INCLUDING ONE OR MORE SECRETS DISTRIBUTION FACTORS USED TO CONTROL THE DISTRIBUTION OF THE ONE OR MORE SECRETS OPERATION 305 secrets distribution policy data representing secrets distribution policy and one or more secrets distribution factors used to control the distribution of the one or more secrets, and classes of secrets, is generated and provided.

In one embodiment, the secrets distribution factors include one or more checks or tests to be performed on virtual assets requesting secrets data that allow for a determination as to what secrets the requesting virtual asset legitimately needs. A more detailed discussion of specific secrets distribution factors is provided below.

In one embodiment, each virtual asset is assigned a given role. In one embodiment, as part of the secrets distribution policy of PROVIDE SECRETS DISTRIBUTION POLICY DATA INCLUDING ONE OR MORE SECRETS DISTRIBUTION FACTORS USED TO CONTROL THE DISTRIBUTION OF THE ONE OR MORE SECRETS OPERATION 305 the secrets that can be provided to each role is defined. In one embodiment, these roles are defined in secrets meta-data.

In one embodiment, each virtual asset is assigned a single role. However, many virtual assets can be assigned, and play, the same role. For example, this would be the case with a "POD1-WEB-Instance".

In other embodiments, a given virtual asset can play multiple roles, for example, a Web Instance can have a role called "web-instance" and same instance can have the role of "cache-server".

In one embodiment, the secrets distribution factors include one or more checks or tests to be performed on virtual assets requesting secrets data that allow for a determination as to what secrets the requesting virtual asset legitimately needs. A more detailed discussion of specific secrets distribution factors is provided below.

In various embodiments, the secrets distribution policy data is open-endedly defined such that the secrets distribution policy, and/or secrets distribution factors, can be defined by the one or more parties associated with the distribution of the secrets, such as, but not limited to, the owner of a data center keeping or accessing the secrets data, the owner or provider of a cloud, the owner or a provider of a service, the owner or provider of one or more resources accessible using the secrets data, and/or any other party legitimately authorized to control the distribution of secrets. In this way, using process 300 for distributing secrets, the secrets distribution policy can of PROVIDE SECRETS DISTRIBUTION POLICY DATA INCLUDING ONE OR MORE SECRETS DISTRIBUTION FACTORS USED TO CONTROL THE DISTRIBUTION OF THE ONE OR MORE SECRETS OPERATION 305 be tailored to the specific needs of the one or more parties associated with the distribution of the secrets. In addition, the secrets distribution policies, and/or secrets distribution factors, can be added, modified, or deleted, as needed to meet the needs of the one or more parties associated with the distribution of secrets.

In one embodiment, once secrets distribution policy data representing secrets distribution policy and one or more secrets distribution factors used to control the distribution of the one or more secrets, and classes of secrets, is generated and provided at PROVIDE SECRETS DISTRIBUTION POLICY DATA INCLUDING ONE OR MORE SECRETS DISTRIBUTION FACTORS USED TO CONTROL THE DISTRIBUTION OF THE ONE OR MORE SECRETS OPERATION 305, process flow proceeds to RECEIVE SECRETS REQUEST DATA FROM A REQUESTING VIRTUAL ASSET OPERATION 307.

In one embodiment, at RECEIVE SECRETS REQUEST DATA FROM A REQUESTING VIRTUAL ASSET OPERATION 307 a secrets request is received from a requesting virtual asset for one or more secrets required to obtain access to one or more resources.

As noted above, herein, the term "virtual asset" includes any virtualized entity or resource requiring access to various resources, and types of resources. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or mobile devices, remote sensors, laptops, desktops, point-of-sale devices, ATMs, electronic voting machines requiring access to various resources, and/or types of resources, located within a data center, within the cloud, and/or any other physical or logical location, as discussed herein, and/or as known/available in the art at the time of filing, and/or as developed/made available after the time of filing.

As discussed in more detail below, when a virtual asset is initiated, or created, in a cloud environment, the virtual asset typically requires access to one or more resources in the cloud, external to the cloud, and/or in one or more data centers. As also discussed in more detail below, in order to access these resources the virtual assets typically must obtain secrets data representing one or more secrets required to access the needed resources. Herein, a virtual asset attempting to access a resource, and therefore requesting secrets data, is referred to as a "requesting virtual asset."

In one embodiment, at RECEIVE SECRETS REQUEST DATA FROM A REQUESTING VIRTUAL ASSET OPERATION 307 the secrets request data is generated under the direction of a secret managing client module that initiates the request to get secrets. In one embodiment, the secret managing client module is distributed to authenticated virtual assets.

In one embodiment, at RECEIVE SECRETS REQUEST DATA FROM A REQUESTING VIRTUAL ASSET OPERATION 307 the secrets request is received from the requesting virtual asset in the form of secrets request data. In one embodiment, at RECEIVE SECRETS REQUEST DATA FROM A REQUESTING VIRTUAL ASSET OPERATION 307 the secrets request data is received from the requesting virtual data at a services gateway associated with a data/resources services center, e.g., a data center, where the secrets data is maintained, and/or through which the secrets data is accessed. In some embodiments, the requesting virtual asset is configured such that when the virtual asset is initiated, code built into the virtual asset image is used to contact the services gateway directly. In one embodiment, at RECEIVE SECRETS REQUEST DATA FROM A REQUESTING VIRTUAL ASSET OPERATION 307 the secrets request data is received from the requesting virtual asset at the services gateway through a trusted communication channel such as, for example, an authenticated Secure Sockets Layer (SSL) communication channel.

In one embodiment, the secrets request data is received from the requesting virtual asset at RECEIVE SECRETS REQUEST DATA FROM A REQUESTING VIRTUAL ASSET OPERATION 307 through a services gateway proxy that, in turn, is communicatively coupled to the services gateway. In one embodiment, the secrets request data is received from the requesting virtual asset at the services gateway proxy through a trusted communication channel such as, for example, an authenticated SSL communication channel. In one embodiment, the services gateway proxy is also connected to the services gateway by a trusted communication channel, such as an authenticated SSL communication channel.

In various embodiments, the secrets request data of RECEIVE SECRETS REQUEST DATA FROM A REQUESTING VIRTUAL ASSET OPERATION 307 includes a request for certain classes of secrets or specific secrets associated with specific resources. In some embodiments, the secrets request data of RECEIVE SECRETS REQUEST DATA FROM A REQUESTING VIRTUAL ASSET OPERATION 307 is actually a request for access to resources that require secrets so that the request to access the resources is, de-facto, a request for secrets data.

In one embodiment the secrets request data of RECEIVE SECRETS REQUEST DATA FROM A REQUESTING VIRTUAL ASSET OPERATION 307 is a listing or set of the requesting virtual asset's specific parameters that will be used by services gateway to verify the provided parameters by making API calls to the owner or provider of a cloud service.

In one embodiment, at RECEIVE SECRETS REQUEST DATA FROM A REQUESTING VIRTUAL ASSET OPERATION 307 the secrets request data is forwarded from the services gateway to a secrets distribution management service/system.

In one embodiment, once a secrets request is received from a requesting virtual asset for one or more secrets required to obtain access to one or more resources at RECEIVE SECRETS REQUEST DATA FROM A REQUESTING VIR- TUAL ASSET OPERATION 307, process flow proceeds to OBTAIN REQUESTING VIRTUAL ASSET PROFILE DATA ASSOCIATED WITH THE REQUESTING VIRTUAL ASSET OPERATION 309.

In one embodiment, at OBTAIN REQUESTING VIRTUAL ASSET PROFILE DATA ASSOCIATED WITH THE REQUESTING VIRTUAL ASSET OPERATION 309 requesting virtual asset profile data associated with the requesting virtual asset is obtained.

In one embodiment, at OBTAIN REQUESTING VIRTUAL ASSET PROFILE DATA ASSOCIATED WITH THE REQUESTING VIRTUAL ASSET OPERATION 309 the secrets distribution management service/system obtains the requesting virtual asset profile data associated with the requesting virtual asset.

In various embodiments, the virtual asset profile data associated with the requesting virtual asset of OBTAIN REQUESTING VIRTUAL ASSET PROFILE DATA ASSOCIATED WITH THE REQUESTING VIRTUAL ASSET OPERATION 309 includes, but is not limited to, owner identification data associated with an owner of the requesting virtual asset, such as the account number of an owner of the virtual asset; data indicating the type of requesting virtual asset such as whether the requesting virtual asset is a server instance, a data store, and whether the requesting virtual asset is associated with a specific location or tier, such as a web tier, and/or logically requires access to internal resources or external resources, such as the Internet, etc.; data indicating any special capabilities or modules associated with the requesting virtual asset; data indicating the size and number of resources allocated to the requesting virtual asset; data indicating how long the requesting virtual asset has existed or has been running; data indicating where the virtual asset resides and/or is being initiated, such as in a subnet of a Virtual Private Cloud (VPC), or in a public cloud, etc.; data indicating security parameters and procedures associated with the requesting virtual asset; an instance ID; an instance type; an instance IP address; an authorization role assigned to a virtual asset by the owner or provider of a cloud service; and/or any other virtual asset profile data desired and defined by any party legitimately associated with the distribution of secrets.

As with the secrets distribution policy data, in various embodiments, the requesting virtual asset profile data to be obtained at OBTAIN REQUESTING VIRTUAL ASSET PROFILE DATA ASSOCIATED WITH THE REQUESTING VIRTUAL ASSET OPERATION 309 is open-endedly defined such that the virtual asset profile data obtained can be defined by the one or more parties associated with the distribution of the secrets, such as, but not limited to, the owner of a data center keeping or accessing the secrets data, the owner or provider of a cloud, the owner or a provider of a service, the owner or provider of one or more resources accessible using the secrets data, and/or any other party legitimately authorized to control the distribution of secrets. In this way, using the disclosed process for distributing secrets, the requesting virtual asset profile data obtained, and therefore the requesting virtual asset profile data available for analysis, can be tailored to the specific needs of the one or more parties associated with the distribution of the secrets. In addition, portions of the requesting virtual asset profile data to be obtained can be added, modified, or deleted, as needed to meet the needs of the one or more parties associated with the distribution of secrets.

In one embodiment, once requesting virtual asset profile data associated with the requesting virtual asset is obtained at OBTAIN REQUESTING VIRTUAL ASSET PROFILE DATA ASSOCIATED WITH THE REQUESTING VIRTUAL ASSET OPERATION 309, process flow proceeds to AUTHENTICATE THE REQUESTING VIRTUAL ASSET OPERATION 311.

In one embodiment, once the requesting virtual asset profile data is obtained at OBTAIN REQUESTING VIRTUAL ASSET PROFILE DATA ASSOCIATED WITH THE REQUESTING VIRTUAL ASSET OPERATION 309, the requesting virtual asset is authenticated at AUTHENTICATE THE REQUESTING VIRTUAL ASSET OPERATION 311 to confirm that the requesting virtual asset is a legitimate entity and is eligible to receive any portion of secrets data, i.e., any secrets, at all.

In one embodiment, the requesting virtual asset is authenticated at AUTHENTICATE THE REQUESTING VIRTUAL ASSET OPERATION 311 by analyzing the requesting virtual asset profile data of OBTAIN REQUESTING VIRTUAL ASSET PROFILE DATA ASSOCIATED WITH THE REQUESTING VIRTUAL ASSET OPERATION 309 to determine an identification number associated with the owner of the requesting virtual asset. Then the identification number associated with the owner of the requesting virtual asset is compared with a registry or listing of identification numbers associated with known and trusted owners.

In addition, in many cases, the identification number associated with the owner of the requesting virtual asset is also linked to data indicating all virtual assets associated with that owner. Consequently, by determining the identification of the owner of the requesting virtual asset at AUTHENTICATE THE REQUESTING VIRTUAL ASSET OPERATION 311, a determination can be made as to whether the requesting virtual asset itself is a legitimate virtual asset.

As a specific illustrative example, at AUTHENTICATE THE REQUESTING VIRTUAL ASSET OPERATION 311 an owner's account number is compared with a registry or listing of trusted owners' account numbers. As an even more specific illustrative example, at AUTHENTICATE THE REQUESTING VIRTUAL ASSET OPERATION 311 an owner's account number with a cloud provider is compared with a list of trusted owners' account numbers to determine if the owner of the requesting virtual asset is a trusted entity. Since, as noted, an owner's account number is typically linked to data indicating all virtual assets associated with the account, comparing the owner's account number with a registry of trusted account numbers allows for a determination to be made at least as to whether the requesting virtual asset is an asset that should be provided some portion of the secrets data, i.e., one or more secrets represented by the secrets data.

In one embodiment, the requesting virtual asset is authenticated at AUTHENTICATE THE REQUESTING VIRTUAL ASSET OPERATION 311 by analyzing the requesting virtual asset profile data to determine whether the requesting virtual asset is in compliance with one or more security policies. Using this authentication parameter, an initial determination can be made at least as to whether the requesting virtual asset has sufficient security mechanisms/features in place, and/or associated with it, to ensure not only that the requesting virtual asset is authorized to receive such secrets, but that the secrets data itself will be secure once it is provided to the requesting virtual asset.

As a specific illustrative example, if security policies dictate that virtual assets receiving certain secrets must be part of a subnet of a virtual public cloud, at AUTHENTICATE THE REQUESTING VIRTUAL ASSET OPERATION 311 a determination that this is indeed the case for a requesting virtual asset is made before any secrets data is provided to a requesting virtual asset.

In one embodiment, the requesting virtual asset is authenticated at AUTHENTICATE THE REQUESTING VIRTUAL ASSET OPERATION 311 using any authentication means, processes, methods, and/or procedures, or combinations of authentication means, processes, methods, and/or procedures, as discussed herein, and/or as known in the art/available at the time of filing, and/or as developed/made available after the time of filing.

In one embodiment, once the requesting virtual asset is authenticated to confirm that the requesting virtual asset is a legitimate entity and is eligible to receive any portion of secrets data at AUTHENTICATE THE REQUESTING VIRTUAL ASSET OPERATION 311, process flow proceeds to ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313.

In one embodiment, once the requesting virtual asset is authenticated at AUTHENTICATE THE REQUESTING VIRTUAL ASSET OPERATION 311 and it is determined that the requesting virtual asset is eligible to receive some form of secrets, the requesting virtual asset profile data is further analyzed at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 to determine what classes of secrets the requesting virtual asset of RECEIVE SECRETS REQUEST DATA FROM A REQUESTING VIRTUAL ASSET OPERATION 307 legitimately needs, and therefore is eligible to receive.

As noted above, in one embodiment, the secrets distribution policy data of PROVIDE SECRETS DISTRIBUTION POLICY DATA INCLUDING ONE OR MORE SECRETS DISTRIBUTION FACTORS USED TO CONTROL THE DISTRIBUTION OF THE ONE OR MORE SECRETS OPERATION 305 includes data representing secrets distribution factors. As also noted above, the secrets distribution factors include one or more checks or tests to be performed on requesting virtual assets profile data to determine what secrets, and/or classes of secrets, the requesting virtual asset legitimately needs and is authorized to receive.

Specific examples of secrets distribution factors used at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 include but are not limited to, making a determination as to whether owner identification data associated with the owner of the requesting virtual asset is included in a registry of trusted owners' owner identification data; if this determination has not already been made as part of the authentication process of AUTHENTICATE THE REQUESTING VIRTUAL ASSET OPERATION 311 discussed above.

As noted above, using this secrets distribution factor at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 a registry of trusted owners' owner identification data such as, in one illustrative example, an owner's account number is compared with a registry or listing of trusted owners' account numbers. As a more specific illustrative example, an owner's account number with a cloud provider is compared with a list of trusted owner's account numbers to determine if the requesting virtual asset is a trusted entity. In addition, since generally an owner's account number includes data indicating all virtual assets associated with the account, comparing the owner's account number with a registry of trusted account numbers allows for a determination to be made about the type of requesting virtual asset and what types of secrets that requesting virtual asset might legitimately need.

In addition, an analysis of the account number associated with an owner of the requesting virtual asset at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 can also provide information regarding a budget associated with that account number and therefore what resources the owner of the requesting virtual asset can afford to access on behalf of the requesting virtual asset. Consequently, this data also can be used to determine what classes of secrets, or individual secrets, the requesting virtual asset is eligible to receive.

As also noted above, another specific illustrative example of a secrets distribution factor that can be used at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 includes making a determination as to security associated with the requesting virtual asset, and whether the requesting virtual asset is in compliance with one or more security policies. Using this secrets distribution factor at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313, an initial determination can be made at least as to whether the requesting virtual asset has sufficient security mechanisms/features in place, and/or associated with it, to receive certain classes of secrets.

For instance, there may be a requirement that in order to receive secrets classified as encryption related secrets, a higher level of security must be in place on the requesting virtual asset than that required to receive passwords to a social networking system. Consequently, this data can be used at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 to determine what classes of secrets, or individual secrets, the requesting virtual asset is eligible to receive.

Another specific illustrative example of a secrets distribution factor used at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 includes making a determination as to how long the requesting virtual asset has currently been operating. Using this secrets distribution factor a determination can be made as to whether the requesting virtual assets request for secrets data is temporally logical.

For instance, as noted above, specific examples of virtual assets include instances generated within a cloud computing environment. In general, an instance is a virtual server generated within a cloud computing environment that includes allocated operating systems, processing power, data storage, and communication systems. Instances can generally be created and destroyed within the cloud as needed.

When instances are first initiated, i.e., created or re-created, in the cloud, the instance typically needs to access various resources in order to perform its intended task. To this end, the instance also typically requires one or more secrets in order to access the required resources. Consequently, the most logical time for an instance, or other virtual asset, to have need for, and to request, secrets data is when the instance, or other virtual asset, is being initiated. Typically, it is at this point in the virtual asset's life that it requires the secrets data in order to access the resources it needs to perform its function.

Consequently, when a requesting virtual asset makes a secrets data request after the requesting virtual asset has been in existence for a threshold period of time, this can be an indication at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 that the requesting virtual asset is not a legitimate recipient of secrets data. However in some cases, a virtual asset can have a legitimate need to obtain secrets data after that virtual asset has been in existence for significant amount of time. In these cases, this particular secrets distribution factor is either not used at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313, or is given a lower weight or priority at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313.

Another specific illustrative example of a secrets distribution factor used at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 includes a determination of the number or resources associated with the requesting virtual asset. Using this secrets distribution factor a determination is made as to the number of resources that are already allocated to the requesting virtual asset.

For instance, a requesting virtual asset that currently has large amounts of processing power, data storage capacity, and perhaps multiple instances, associated with it, is naturally given greater scrutiny at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 than a requesting virtual asset having minimal resources. As a specific example, when large amounts of resources associated with a requesting virtual asset are identified, multiple secret distribution factors may be applied to that virtual asset at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 before secrets data is provided to the virtual asset.

Another specific illustrative example of a secrets distribution factor used at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 includes a determination of modules or capabilities associated with the requesting virtual asset.

By examining the capabilities, and/or special modules or functions, associated with, and/or performed by a requesting virtual asset, at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 a determination can be made as to what classes of secrets the requesting virtual asset may need.

For instance, a requesting virtual asset that includes a module for processing financial data is likely to have a legitimate need for access to secrets related to accessing financial data from a data center. In contrast, a specialized requesting virtual asset that includes a module associated with analyzing genome data, or includes resources that are directed to processing large amounts of empirical data, is less likely to have a legitimate need for access to secrets related to accessing financial data.

Another specific illustrative example of a secrets distribution factor used at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 includes a determination of the type of requesting virtual asset and the legitimate access requirements of that type of requesting virtual asset.

For instance, a requesting virtual asset that is related to a database is considered potentially more problematic than a requesting virtual asset that is a single instance within a cloud computing environment. Consequently, when a determination is made at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 that the requesting virtual asset is a database related asset, that requesting virtual asset is held to a higher security standard and subjected to more secrets distribution factor analysis.

As noted above, in one embodiment, each virtual asset is assigned a given role. In one embodiment, as part of the secrets distribution policy, the secrets that can be provided to each role is defined. In one embodiment, these roles are defined in secrets meta-data. As a result, another specific illustrative example of a secrets distribution factor used at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 includes determining an authorization role assigned to the virtual asset by the owner or provider of a cloud service.

In various embodiments, as indicated above, the number and types of secret distribution factors to be applied to the requesting virtual asset at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 is determined, at least in part, based on various features of the requesting virtual asset as indicated in the analysis of requesting virtual asset profile data.

As also noted above, both the secrets distribution policy data, including the secrets distribution factors, of PROVIDE SECRETS DISTRIBUTION POLICY DATA INCLUDING ONE OR MORE SECRETS DISTRIBUTION FACTORS USED TO CONTROL THE DISTRIBUTION OF THE ONE OR MORE SECRETS OPERATION 305 and the virtual asset profile data to be obtained of OBTAIN REQUESTING VIRTUAL ASSET PROFILE DATA ASSOCIATED WITH THE REQUESTING VIRTUAL ASSET OPERATION 309, are open-ended and can be defined by the one or more parties associated with the distribution of the secrets. Consequently, the type and number of secret distribution factors applied to a requesting virtual asset at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 is also open-ended.

In one embodiment, once the requesting virtual asset profile data is further analyzed to determine what classes of secrets the requesting virtual asset legitimately needs, and therefore is eligible to receive at ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313, process flow proceeds to OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 315.

In one embodiment, as a result of the analysis of the requesting virtual assets profile data using the secrets distribution policy, including the secret distribution factors, of ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 a determination is made as to what classes of secrets, or specific secrets, the requesting virtual asset is eligible to receive at OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 315.

In one embodiment, the result of the determination of ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 is the generation of authorized secret classes data indicating the authorized classes of secrets, and/or specific secrets, the requesting virtual asset is eligible to receive.

In one embodiment, at OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 315 data representing one or more secrets in the secrets data of PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 303 is obtained for the requesting virtual asset of RECEIVE SECRETS REQUEST DATA FROM A REQUESTING VIRTUAL ASSET OPERATION 307 in accordance with the authorized secret classes data of OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 315.

In one embodiment, the data representing one or more secrets is obtained at OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 315 from one or more secrets databases through a secrets distribution management system that resides, in one embodiment, at the data/resources service center, e.g., the data center.

In one embodiment, the data representing the one or more secrets determined to be appropriate to provide to the requesting virtual asset is collected into a single set of authorized secret set data at OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 315 that includes all of the secrets that it has been determined the requesting resource asset of RECEIVE SECRETS REQUEST DATA FROM A REQUESTING VIRTUAL ASSET OPERATION 307 legitimately requires.

In one embodiment, once data representing one or more secrets in the secrets data of PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 303 is obtained for the requesting virtual asset of RECEIVE SECRETS REQUEST DATA FROM A REQUESTING VIRTUAL ASSET OPERATION 307 in accordance with the authorized secret classes data of ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313 at OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 315, process flow proceeds to PROVIDE THE REQUESTING VIRTUAL ASSET ACCESS TO THE AUTHORIZED SECRETS SET DATA FOR THE REQUESTING VIRTUAL ASSET OPERATION 317.

In one embodiment, once the authorized secret set data is obtained at OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 315, the authorized secret set data is provided to the requesting virtual asset of RECEIVE SECRETS REQUEST DATA FROM A REQUESTING VIRTUAL ASSET OPERATION 307 at PROVIDE THE REQUESTING VIRTUAL ASSET ACCESS TO THE AUTHORIZED SECRETS SET DATA FOR THE REQUESTING VIRTUAL ASSET OPERATION 317.

In one embodiment, the authorized secret set data is provided to the requesting virtual asset at PROVIDE THE REQUESTING VIRTUAL ASSET ACCESS TO THE AUTHORIZED SECRETS SET DATA FOR THE REQUESTING VIRTUAL ASSET OPERATION 317 via a trusted communications channel, such as an authenticated SSL communications channel, and/or through a services gateway, and/or a services gateway proxy, if present.

In one embodiment, once the requesting virtual asset of RECEIVE SECRETS REQUEST DATA FROM A REQUESTING VIRTUAL ASSET OPERATION 307 receives the authorized secret set data of OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 315 at PROVIDE THE REQUESTING VIRTUAL ASSET ACCESS TO THE AUTHORIZED SECRETS SET DATA FOR THE REQUESTING VIRTUAL ASSET OPERATION 317, the requesting virtual asset uses the secrets contained in the authorized secret set data to obtain access to the resources it needs to perform its designated tasks.

In one embodiment, once the authorized secret set data is provided to the requesting virtual asset of RECEIVE SECRETS REQUEST DATA FROM A REQUESTING VIRTUAL ASSET OPERATION 307 at PROVIDE THE REQUESTING VIRTUAL ASSET ACCESS TO THE AUTHORIZED SECRETS SET DATA FOR THE REQUESTING VIRTUAL ASSET OPERATION 317, process flow proceeds to EXIT OPERATION 330.

In one embodiment, at EXIT OPERATION 330 process 300 for distributing secrets is exited to await new data.

In some embodiments the authorized secret set data is provided to the requesting virtual asset via a secrets data store a separate location.

Figure 4:
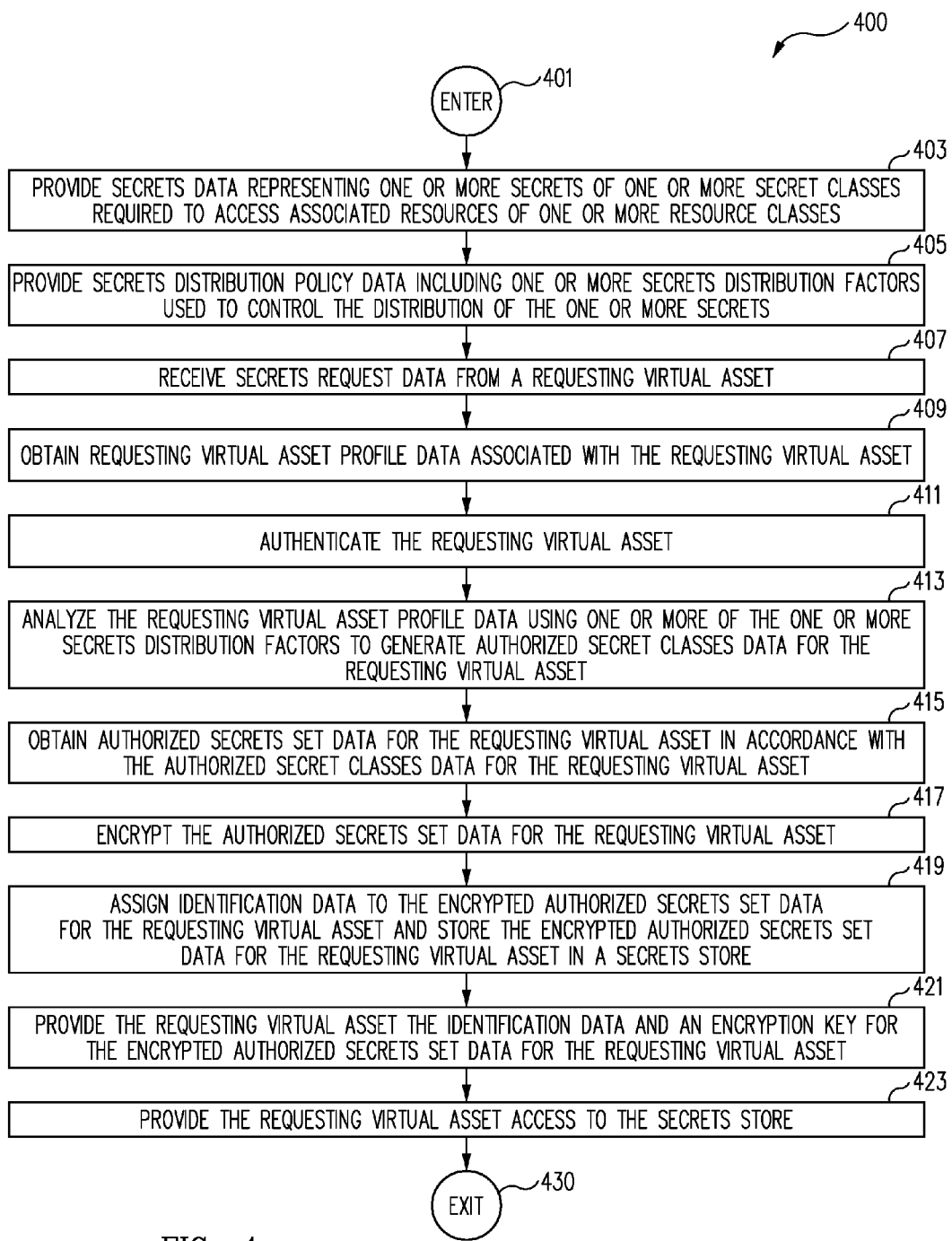
FIG. 4 is a flow chart depicting a process for distributing secrets in accordance with one embodiment.

FIG. 4 is a flow chart of a process 400 for distributing secrets in accordance with one embodiment. In one embodiment, process 400 for distributing secrets begins at ENTER OPERATION 401 of FIG. 4 and process flow proceeds to PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 403.

In various embodiments, PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 403; PROVIDE SECRETS DISTRIBUTION POLICY DATA INCLUDING ONE OR MORE SECRETS DISTRIBUTION FACTORS USED TO CONTROL THE DISTRIBUTION OF THE ONE OR MORE SECRETS OPERATION 405; RECEIVE SECRETS REQUEST DATA FROM A REQUESTING VIRTUAL ASSET OPERATION 407; OBTAIN REQUESTING VIRTUAL ASSET PROFILE DATA ASSOCIATED WITH THE REQUESTING VIRTUAL ASSET OPERATION 409; AUTHENTICATE THE REQUESTING VIRTUAL ASSET OPERATION 411; ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 413; and OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 415 of process 400 for distributing secrets are substantially similar to PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 303; PROVIDE SECRETS DISTRIBUTION POLICY DATA INCLUDING ONE OR MORE SECRETS DISTRIBUTION FACTORS USED TO CONTROL THE DISTRIBUTION OF THE ONE OR MORE SECRETS OPERATION 305; RECEIVE SECRETS REQUEST DATA FROM A REQUESTING VIRTUAL ASSET OPERATION 307; OBTAIN REQUESTING VIRTUAL ASSET PROFILE DATA ASSOCIATED WITH THE REQUESTING VIRTUAL ASSET OPERATION 309; AUTHENTICATE THE REQUESTING VIRTUAL ASSET OPERATION 311; ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 313; and OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 315 of process 300 for distributing secrets. Consequently, the reader is referred to the discussion above with respect to process 300 for distributing secrets which is incorporated in the present discussion of process 400 for distributing secrets in its entirety.

In one embodiment, once data representing one or more secrets in the secrets data of PROVIDE SECRETS DATA REPRESENTING ONE OR MORE SECRETS OF ONE OR MORE SECRET CLASSES REQUIRED TO ACCESS ASSOCIATED RESOURCES OF ONE OR MORE RESOURCE CLASSES OPERATION 403 is obtained for the requesting virtual asset of RECEIVE SECRETS REQUEST DATA FROM A REQUESTING VIRTUAL ASSET OPERATION 407 in accordance with the authorized secret classes data of ANALYZE THE REQUESTING VIRTUAL ASSET PROFILE DATA USING ONE OR MORE OF THE ONE OR MORE SECRETS DISTRIBUTION FACTORS TO GENERATE AUTHORIZED SECRET CLASSES DATA FOR THE REQUESTING VIRTUAL ASSET OPERATION 413 at OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 415, process flow proceeds to ENCRYPT THE AUTHORIZED SECRETS SET DATA FOR THE REQUESTING VIRTUAL ASSET OPERATION 417.

In one embodiment, at ENCRYPT THE AUTHORIZED SECRETS SET DATA FOR THE REQUESTING VIRTUAL ASSET OPERATION 417 the authorized secret set data of OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 415 is encrypted.

In one embodiment, at ENCRYPT THE AUTHORIZED SECRETS SET DATA FOR THE REQUESTING VIRTUAL ASSET OPERATION 417 the authorized secret set data of OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 415 is encrypted by an encryption engine located at the data/resources services center, e.g., the data center.

In one embodiment, once the authorized secret set data of OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 415 is encrypted at ENCRYPT THE AUTHORIZED SECRETS SET DATA FOR THE REQUESTING VIRTUAL ASSET OPERATION 417, process flow proceeds to ASSIGN IDENTIFICATION DATA TO THE ENCRYPTED AUTHORIZED SECRETS SET DATA FOR THE REQUESTING VIRTUAL ASSET AND STORE THE ENCRYPTED AUTHORIZED SECRETS SET DATA FOR THE REQUESTING VIRTUAL ASSET IN A SECRETS STORE OPERATION 419.

In one embodiment, at ASSIGN IDENTIFICATION DATA TO THE ENCRYPTED AUTHORIZED SECRETS SET DATA FOR THE REQUESTING VIRTUAL ASSET AND STORE THE ENCRYPTED AUTHORIZED SECRETS SET DATA FOR THE REQUESTING VIRTUAL ASSET IN A SECRETS STORE OPERATION 419 the encrypted authorized secret set data of ENCRYPT THE AUTHORIZED SECRETS SET DATA FOR THE REQUESTING VIRTUAL ASSET OPERATION 417 is assigned authorized secret set data identification data and is then transferred/transmitted to a secrets data store where it is stored pending access by the requesting virtual asset.

In one embodiment, once the encrypted authorized secret set data of ENCRYPT THE AUTHORIZED SECRETS SET DATA FOR THE REQUESTING VIRTUAL ASSET OPERATION 417 is assigned authorized secret set data identification data and is transferred/transmitted to a secrets data store where it is stored pending access by the requesting virtual asset at ASSIGN IDENTIFICATION DATA TO THE ENCRYPTED AUTHORIZED SECRETS SET DATA FOR THE REQUESTING VIRTUAL ASSET AND STORE THE ENCRYPTED AUTHORIZED SECRETS SET DATA FOR THE REQUESTING VIRTUAL ASSET IN A SECRETS STORE OPERATION 419, process flow proceeds to PROVIDE THE REQUESTING VIRTUAL ASSET THE IDENTIFICATION DATA AND AN ENCRYPTION KEY FOR THE ENCRYPTED AUTHORIZED SECRETS SET DATA FOR THE REQUESTING VIRTUAL ASSET OPERATION 421.

In one embodiment, at PROVIDE THE REQUESTING VIRTUAL ASSET THE IDENTIFICATION DATA AND AN ENCRYPTION KEY FOR THE ENCRYPTED AUTHORIZED SECRETS SET DATA FOR THE REQUESTING VIRTUAL ASSET OPERATION 421 data representing the encryption key, i.e., a single secret, is provided to the requesting virtual asset of RECEIVE SECRETS REQUEST DATA FROM A REQUESTING VIRTUAL ASSET OPERATION 407 along with the identification data for the encrypted authorized secret set data of ASSIGN IDENTIFICATION DATA TO THE ENCRYPTED AUTHORIZED SECRETS SET DATA FOR THE REQUESTING VIRTUAL ASSET AND STORE THE ENCRYPTED AUTHORIZED SECRETS SET DATA FOR THE REQUESTING VIRTUAL ASSET IN A SECRETS STORE OPERATION 419.

In one embodiment, once data representing the encryption key, i.e., a single secret, is provided to the requesting virtual asset of RECEIVE SECRETS REQUEST DATA FROM A REQUESTING VIRTUAL ASSET OPERATION 407 along with the identification data for the encrypted authorized secret set data of ASSIGN IDENTIFICATION DATA TO THE ENCRYPTED AUTHORIZED SECRETS SET DATA FOR THE REQUESTING VIRTUAL ASSET AND STORE THE ENCRYPTED AUTHORIZED SECRETS SET DATA FOR THE REQUESTING VIRTUAL ASSET IN A SECRETS STORE OPERATION 419 at PROVIDE THE REQUESTING VIRTUAL ASSET THE IDENTIFICATION DATA AND AN ENCRYPTION KEY FOR THE ENCRYPTED AUTHORIZED SECRETS SET DATA FOR THE REQUESTING VIRTUAL ASSET OPERATION 421, process flow proceeds to PROVIDE THE REQUESTING VIRTUAL ASSET ACCESS TO THE SECRETS STORE OPERATION 423

In one embodiment, at PROVIDE THE REQUESTING VIRTUAL ASSET ACCESS TO THE SECRETS STORE OPERATION 423 the requesting virtual asset of RECEIVE SECRETS REQUEST DATA FROM A REQUESTING VIRTUAL ASSET OPERATION 407 is provided access to the secrets data store of ASSIGN IDENTIFICATION DATA TO THE ENCRYPTED AUTHORIZED SECRETS SET DATA FOR THE REQUESTING VIRTUAL ASSET AND STORE THE ENCRYPTED AUTHORIZED SECRETS SET DATA FOR THE REQUESTING VIRTUAL ASSET IN A SECRETS STORE OPERATION 419.

In one embodiment, the requesting virtual asset of RECEIVE SECRETS REQUEST DATA FROM A REQUESTING VIRTUAL ASSET OPERATION 407 uses the identification data of PROVIDE THE REQUESTING VIRTUAL ASSET THE IDENTIFICATION DATA AND AN ENCRYPTION KEY FOR THE ENCRYPTED AUTHORIZED SECRETS SET DATA FOR THE REQUESTING VIRTUAL ASSET OPERATION 421 to identify the desired encrypted authorized secret set data in the secret data store and provides the encryption key data to access and decrypt the authorized secrets.

In one embodiment, the requesting virtual asset then uses the secrets contained in the authorized secret set data to obtain access to the resources it needs to perform its designated tasks.

In one embodiment, the secrets data store of ASSIGN IDENTIFICATION DATA TO THE ENCRYPTED AUTHORIZED SECRETS SET DATA FOR THE REQUESTING VIRTUAL ASSET AND STORE THE ENCRYPTED AUTHORIZED SECRETS SET DATA FOR THE REQUESTING VIRTUAL ASSET IN A SECRETS STORE OPERATION 419 is a data store or database, or other data storage mechanism, located outside the data center and, in one embodiment, at a physical location closer to the requesting virtual asset.

In this way, in some embodiments, encrypted authorized secret set data is pre-generated at OBTAIN AUTHORIZED SECRETS SET DATA FOR THE REQUESTING VIRTUAL ASSET IN ACCORDANCE WITH THE AUTHORIZED SECRET CLASSES DATA FOR THE REQUESTING VIRTUAL ASSET OPERATION 415 for specific types, and/or classes, of virtual assets and then pre-deployed at ASSIGN IDENTIFICATION DATA TO THE ENCRYPTED AUTHORIZED SECRETS SET DATA FOR THE REQUESTING VIRTUAL ASSET AND STORE THE ENCRYPTED AUTHORIZED SECRETS SET DATA FOR THE REQUESTING VIRTUAL ASSET IN A SECRETS STORE OPERATION 419 to a local secrets data store to await a secrets request data from a requesting virtual asset of the particular type, or class, associated with the encrypted authorized secret set data.

In one embodiment, once the secrets request data is received from a requesting virtual asset of the particular type, or class, associated with the pre-deployed encrypted authorized secret set data at RECEIVE SECRETS REQUEST DATA FROM A REQUESTING VIRTUAL ASSET OPERATION 407, the requesting virtual asset is provided the identification data associated with the pre-deployed encrypted authorized secret set data and the encryption key at PROVIDE THE REQUESTING VIRTUAL ASSET THE IDENTIFICATION DATA AND AN ENCRYPTION KEY FOR THE ENCRYPTED AUTHORIZED SECRETS SET DATA FOR THE REQUESTING VIRTUAL ASSET OPERATION 421. Then, as above, the requesting virtual asset uses the secrets included in the authorized secretive data to access the resources it needs to perform its function at PROVIDE THE REQUESTING VIRTUAL ASSET ACCESS TO THE SECRETS STORE OPERATION 423. However, in this case, the latencies involved in actually collecting the authorized secret set data and transmitting the entire set of authorized secret set data to the requesting virtual asset are avoided.

In one embodiment, once the requesting virtual asset of RECEIVE SECRETS REQUEST DATA FROM A REQUESTING VIRTUAL ASSET OPERATION 407 is provided access to the secrets data store of ASSIGN IDENTIFICATION DATA TO THE ENCRYPTED AUTHORIZED SECRETS SET DATA FOR THE REQUESTING VIRTUAL ASSET AND STORE THE ENCRYPTED AUTHORIZED SECRETS SET DATA FOR THE REQUESTING VIRTUAL ASSET IN A SECRETS STORE OPERATION 419 at PROVIDE THE REQUESTING VIRTUAL ASSET ACCESS TO THE SECRETS STORE OPERATION 423, process flow proceeds to EXIT OPERATION 430.

In one embodiment, at EXIT OPERATION 430 process 400 for distributing secrets is exited to await new data.

Using processes 300 and 400 for distributing secrets discussed above, requesting virtual asset profile data associated with a virtual asset requesting secrets is used to authenticate the requesting virtual asset and then to determine the classes of secrets that requesting virtual asset legitimately needs. Then a set of secrets determined to be legitimately required by the requesting virtual asset is created and sent to the requesting virtual asset. Consequently, using processes 300 and 400 for distributing secrets, a virtual asset can be provided the secrets it needs to perform its tasks in a comprehensive and highly automated manner while still maintaining the security of the secrets and the resources protected by those secrets.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for distributing credentials comprising:
   at least one processor; and
   at least one memory coupled to the at least one processor, the at least one memory having stored therein instructions which when executed by any set of the one or more processors, perform a process for distributing credentials, the process for distributing credentials including:
   receiving request data from a requesting virtual asset, the request data including a request for one or more credentials required in order for the requesting virtual asset to be allowed to access one or more resources, the requested credentials being of a first type of a plurality of credential types, the one or more resources being cloud-accessible resources;
   responsive to receiving the request data, obtaining profile data associated with the requesting virtual asset;
   responsive to receiving the request data, authenticating, by a secrets distribution management system, the requesting virtual asset;
   responsive to authenticating the requesting virtual asset and obtaining profile data associated with the requesting virtual asset, analyzing, by the secrets distribution management system, the profile data using one or more distribution factors to determine one or more credentials of the first type that the requesting virtual asset is authorized to receive, the determination being at least partly based on a role assigned to the requesting virtual asset, the requesting virtual asset being assigned at least two different roles;
   determining a first source from which the first type of credential is available, wherein a plurality of credential sources are available each having different types of credentials, wherein credentials of a first type are only available from a first source, and credentials of a second type are only available from a second source; and
   providing, from the first source, credentials data representing the determined one or more credentials to the requesting virtual asset, the provided credentials data including data representing one or more of the credentials associated with the request data, the providing being accomplished through at least:
   encrypting set data;
   assigning identification data to the encrypted set data;
   storing the encrypted set data in a credentials store;
   providing the requesting virtual asset the identification data and an encryption key for identifying and decrypting the encrypted set data; and
   providing the requesting virtual asset access to the credentials store.

2. The system for distributing credentials of claim 1 wherein at least one of the one or more credentials is selected from the group of credentials consisting of:
   database access credentials;
   external services access credentials;
   internal services access data;
   passwords;
   passphrases;
   biometric data;
   digital certificates;
   encryption keys; and
   SSL certificates.

3. The system for distributing credentials of claim 1 wherein at least one of the one or more resources is selected from the group of resources consisting of:
   databases and data;
   external services;
   internal services;
   cloud-based services;
   data center-based services;
   the Internet;
   a cloud;
   applications;
   encrypted data;
   authenticated SSL communication channels;
   wireless accessible services; and
   any communication channels.

4. The system for distributing credentials of claim 1 wherein at least one of the one or more distribution factors is selected from the group of distribution factors consisting of:
   a determination as to whether owner identification data associated with the owner of the requesting virtual asset is included in a registry of trusted owners' owner identification data;
   a determination as to whether the requesting virtual asset is in compliance with one or more security policies;
   a determination as to how long the requesting virtual asset has currently been operating;
   a determination of the number or resources associated with the requesting virtual asset;
   a determination of modules or capabilities associated with the requesting virtual asset;
   a determination of the type of requesting virtual asset and the legitimate access requirements of that type of requesting virtual asset; and
   any combination thereof.

5. The system for distributing credentials of claim 1 wherein the request data is received from the requesting virtual asset through a resource services gateway.

6. The system for distributing credentials of claim 5 wherein the requesting virtual asset is communicatively coupled to the resource services gateway via a secure communications channel.

7. The system for distributing credentials of claim 6 wherein the secure communications channel is an authenticated Secure Sockets Layer (SSL) communications channel.

8. The system for distributing credentials of claim 1 wherein the request data is received from the requesting virtual asset through a resource services gateway proxy.

9. The system for distributing credentials of claim 8 wherein the requesting virtual asset is communicatively coupled to the resource services gateway proxy via a secure communications channel.

10. The system for distributing credentials of claim 9 wherein the secure communications channel is an authenticated Secure Sockets Layer (SSL) communications channel.

11. The system for distributing credentials of claim 9 wherein the secure communications channel is any private communications channel.

12. The system for distributing credentials of claim 1 wherein the requesting virtual asset is a virtual asset selected from the group of the virtual assets consisting of:
   a virtual machine;
   a virtual server;
   an instance in a cloud infrastructure;
   a cloud infrastructure access system;
   mobile devices;
   remote sensors;
   laptops;
   desktops;
   point-of-sale devices;
   ATMs;
   electronic voting machines; and
   a database.

13. The system for distributing credentials of claim 1 wherein authenticating the requesting virtual asset includes determining whether owner identification data associated with the owner of the requesting virtual asset is included in a registry of trusted owners' owner identification data.

14. The system for distributing credentials of claim 13 wherein owner identification data is an account number associated with the owner of the requesting virtual asset.

15. The system for distributing credentials of claim 1 wherein a number and type of distribution factors used to analyze the profile data is determined by the type of requesting virtual asset.

16. The system for distributing credentials of claim 1 wherein a number and type of distribution factors used to analyze the profile data is determined by the capabilities of the requesting virtual asset.

17. The system for distributing credentials of claim 1 wherein the number and type of distribution factors used to analyze the profile data is determined by the reputation profile of the requesting virtual asset.

18. The system for distributing credentials of claim 1 wherein the number and type of distribution factors used to analyze the profile data is determined by the resources associated with the requesting virtual asset.

19. A system for distributing credentials comprising:
   at least one processor; and
   at least one memory coupled to the at least one processor, the at least one memory having stored therein instructions which when executed by any set of the one or more processors, perform a process for distributing credentials, the process for distributing credentials including:
   receiving request data from a requesting virtual asset, the request data including a request for one or more credentials required in order for the requesting virtual asset to be allowed to access one or more resources, the requested credentials being of a first type of a plurality of credential types, the one or more resources being cloud-accessible resources;
   responsive to receiving the request data, obtaining profile data associated with the requesting virtual asset;
   responsive to receiving the request data, authenticating, by a secrets distribution management system, the requesting virtual asset;
   responsive to authenticating the requesting virtual asset and obtaining profile data associated with the requesting virtual asset, analyzing, by a secrets distribution management system, the profile data using one or more distribution factors to determine one or more classes of credentials the requesting virtual asset is authorized to receive, the determination being at least partly based on a role assigned to the requesting virtual asset, the virtual asset being assigned at least two different roles;
   determining a first source from which the first type of credential is available, wherein a plurality of credential sources are available each having different types of credentials, wherein credentials of a first type are only available from a first source, and credentials of a second type are only available from a second source;
   obtaining set data for the requesting virtual asset, the set data representing a set of credentials for the requesting virtual asset of the classes of credentials the requesting virtual asset is authorized to receive; and
   providing the set data to the requesting virtual asset by at least:
   encrypting the set data;
   assigning identification data to the encrypted set data;
   storing the encrypted set data in a credentials store;
   providing the requesting virtual asset the identification data and an encryption key for identifying and decrypting the encrypted set data; and
   providing the requesting virtual asset access to the credentials store.

20. The system for distributing credentials of claim 19 wherein at least one of the one or more classes of credentials is selected from the group of classes of credentials consisting of:
   database access credentials;
   external services access credentials;
   internal services access data;
   passwords;
   passphrases;
   biometric data;
   digital certificates;
   encryption keys; and
   SSL certificates.

21. The system for distributing credentials of claim 19 wherein at least one of the resources is selected from the group of resource types consisting of:
   databases and data;
   external services;
   internal services;
   cloud-based services;
   data center-based services;
   the Internet;
   a cloud;
   applications;

encrypted data;
authenticated SSL communication channels;
wireless accessible services; and
any communication channels.

22. The system for distributing credentials of claim 19 wherein at least one of the one or more distribution factors is selected from the group of distribution factors consisting of:
- a determination as to whether owner identification data associated with the owner of the requesting virtual asset is included in a registry of trusted owners' owner identification data;
- a determination as to whether the requesting virtual asset is in compliance with one or more security policies;
- a determination as to how long the requesting virtual asset has currently been operating;
- a determination of the number or resources associated with the requesting virtual asset;
- a determination of modules or capabilities associated with the requesting virtual asset;
- a determination of the type of requesting virtual asset and the legitimate access requirements of that type of requesting virtual asset; and
- any combination thereof.

23. The system for distributing credentials of claim 19 wherein the request data is received from the requesting virtual asset through a resource services gateway.

24. The system for distributing credentials of claim 23 wherein the requesting virtual asset is communicatively coupled to the resource services gateway via a secure communications channel.

25. The system for distributing credentials of claim 24 wherein the secure communications channel is an authenticated Secure Sockets Layer (SSL) communications channel.

26. The system for distributing credentials of claim 24 wherein the secure communications channel is any private communications channel.

27. The system for distributing credentials of claim 19 wherein the request data is received from the requesting virtual asset through a resource services gateway proxy.

28. The system for distributing credentials of claim 27 wherein the requesting virtual asset is communicatively coupled to the resource services gateway proxy via a secure communications channel.

29. The system for distributing credentials of claim 28 wherein the secure communications channel is a Secure Sockets Layer an authenticated communications channel.

30. The system for distributing credentials of claim 19 wherein the requesting virtual asset is a virtual asset selected from the group of the virtual assets consisting of:
- a virtual machine;
- a virtual server;
- an instance in a cloud infrastructure;
- a cloud infrastructure access system;
- mobile devices;
- remote sensors;
- laptops;
- desktops;
- point-of-sale devices;
- ATMs;
- electronic voting machines; and
- a database.

31. The system for distributing credentials of claim 19 wherein authenticating the requesting virtual asset includes determining whether owner identification data associated with the owner of the requesting virtual asset is included in a registry of trusted owners' owner identification data.

32. The system for distributing credentials of claim 31 wherein owner identification data is an account number associated with the owner of the requesting virtual asset.

33. The system for distributing credentials of claim 19 wherein the number and type of distribution factors used to analyze the requesting virtual asset profile data is determined by the type of requesting virtual asset.

34. The system for distributing credentials of claim 19 wherein the number and type of distribution factors used to analyze the requesting virtual asset profile data is determined by the reputation profile of the requesting virtual asset.

35. The system for distributing credentials of claim 19 wherein the number and type of distribution factors used to analyze the requesting virtual asset profile data is determined by the capabilities of the requesting virtual asset.

36. The system for distributing credentials of claim 19 wherein the number and type of distribution factors used to analyze the requesting virtual asset profile data is determined by the resources associated with the requesting virtual asset.

37. A system for distributing credentials comprising:
- one or more resources potentially accessible by one or more virtual assets, the one or more resources being of two or more resource types;
- two or more credentials databases, each credentials database including credentials data representing one or more credentials, the one or more credentials being required to access associated ones of the one or more resources, the one or more credentials being of one or more credential classes, each of the credential classes being associated with one of the one or more resource types;
- a credentials distribution management system, the credentials distribution management system having access to the one or more credentials in the one or more credentials databases, the credentials distribution management system further having access to credentials distribution policy data representing one or more distribution factors used to control the distribution of the one or more credentials;
- a requesting virtual asset;
- a services gateway, the services gateway being communicatively coupled to the requesting virtual asset, the services gateway being communicatively coupled to the credentials distribution management system;
- at least one processor; and
- at least one memory coupled to the at least one processor, the at least one memory having stored therein instructions which when executed by any set of the one or more processors, perform a process for distributing credentials, the process for distributing credentials including:
- receiving request data at the service gateway from the requesting virtual asset for credentials required in order for the requesting virtual asset to be allowed to access one or more resources, the requested credentials including a first type of a plurality of credential types, the one or more resources being cloud-accessible resources;
- responsive to receiving the request data, the credentials distribution management system authenticating the requesting virtual asset;
- responsive to authenticating the requesting virtual asset, the credentials distribution management system analyzing profile data of the requesting virtual asset using one or more of the one or more distribution factors to determine classes of credentials the requesting virtual asset is authorized to receive, the determination being at least partly based on a role assigned to the requesting virtual asset, the virtual asset being assigned at least two different roles;

determining a first source from which the first type of credential is available, wherein a plurality of credential sources are available each having different types of credentials, wherein credentials of a first type are only available from a first source, and credentials of a second type are only available from a second source;

the credentials distribution management system obtaining set data for the requesting virtual asset, the set data including the requested credential and representing a set of credentials for the requesting virtual asset of the classes of credentials the requesting virtual asset is authorized to receive, the set data being obtained from the one or more credentials databases; and providing the set data to the requesting virtual asset by at least:
encrypting the set data;
assigning identification data to the encrypted set data;
storing the encrypted set data in a credentials store;
providing the requesting virtual asset the identification data and an encryption key for identifying and decrypting the encrypted set data; and
providing the requesting virtual asset access to the credentials store.

38. The system for distributing credentials of claim 37 wherein at least one of the one or more classes of credentials is selected from the group of classes of credentials consisting of:
database access credentials;
external services access credentials;
internal services access credentials
passwords;
passphrases;
biometric data;
digital certificates;
encryption keys; and
SSL certificates.

39. The system for distributing credentials of claim 37 wherein at least one of the one or more resources is selected from the group of resources consisting of:
databases and data;
external services;
internal services;
cloud-based services;
data center-based services;
the Internet;
a cloud;
applications;
encrypted data;
authenticated SSL communication channels;
wireless accessible services; and
any communication channels.

40. The system for distributing credentials of claim 37 wherein at least one of the one or more distribution factors is selected from the group of distribution factors consisting of:
a determination as to whether owner identification data associated with the owner of the requesting virtual asset is included in a registry of trusted owners' owner identification data;
a determination as to whether the requesting virtual asset is in compliance with one or more security policies;
a determination as to how long the requesting virtual asset has currently been operating;
a determination of the number or resources associated with the requesting virtual asset;
a determination of modules or capabilities associated with the requesting virtual asset;
a determination of the type of requesting virtual asset and the legitimate access requirements of that type of requesting virtual asset; and
any combination thereof.

41. The system for distributing credentials of claim 37 wherein the requesting virtual asset is communicatively coupled to the resource services gateway via a secure communications channel.

42. The system for distributing credentials of claim 41 wherein the secure communications channel is an authenticated Secure Sockets Layer (SSL) communications channel.

43. The system for distributing credentials of claim 41 wherein the secure communications channel is any private communications channel.

44. The system for distributing credentials of claim 37 wherein the requesting virtual asset is a virtual asset selected from the group of the virtual assets consisting of:
a virtual machine;
a virtual server;
an instance in a cloud infrastructure;
a cloud infrastructure access system;
mobile devices;
remote sensors;
laptops;
desktops;
point-of-sale devices;
ATMs;
electronic voting machines; and
a database.

45. The system for distributing credentials of claim 37 wherein authenticating the requesting virtual asset includes determining whether owner identification data associated with the owner of the requesting virtual asset is included in a registry of trusted owners' owner identification data.

46. The system for distributing credentials of claim 40 wherein owner identification data is an account number associated with the owner of the requesting virtual asset.

47. The system for distributing credentials of claim 37 wherein the number and type of distribution factors used to analyze the requesting virtual asset profile data is determined by the type of requesting virtual asset.

48. The system for distributing credentials of claim 37 wherein the number and type of distribution factors used to analyze the requesting virtual asset profile data is determined by the reputation profile of the requesting virtual asset.

49. The system for distributing credentials of claim 37 wherein the number and type of distribution factors used to analyze the requesting virtual asset profile data is determined by the capabilities of the requesting virtual asset.

50. The system for distributing credentials of claim 37 wherein the number and type of distribution factors used to analyze the requesting virtual asset profile data is determined by the resources associated with the requesting virtual asset.

* * * * *